United States Patent
Ockenfuss

(10) Patent No.: US 10,451,783 B2
(45) Date of Patent: Oct. 22, 2019

(54) INDUCED TRANSMISSION FILTER HAVING PLURAL GROUPS OF ALTERNATING LAYERS OF DIELECTRIC MATERIAL FOR FILTERING LIGHT WITH LESS THAN A THRESHOLD ANGLE SHIFT

(71) Applicant: Viavi Solutions Inc., Milpitas, CA (US)

(72) Inventor: Georg J. Ockenfuss, Santa Rosa, CA (US)

(73) Assignee: VIAVI Solutions Inc., San Jose, CA (US)

( * ) Notice: Subject to any disclaimer, the term of this patent is extended or adjusted under 35 U.S.C. 154(b) by 205 days.

(21) Appl. No.: 15/601,773

(22) Filed: May 22, 2017

(65) Prior Publication Data

US 2018/0335554 A1    Nov. 22, 2018

(51) Int. Cl.
*G02B 5/20*    (2006.01)
*G02B 5/26*    (2006.01)
*G02B 5/28*    (2006.01)

(52) U.S. Cl.
CPC .............. *G02B 5/26* (2013.01); *G02B 5/20* (2013.01); *G02B 5/201* (2013.01); *G02B 5/28* (2013.01); *G02B 5/285* (2013.01); *G02B 5/282* (2013.01)

(58) Field of Classification Search
CPC . G02B 5/204; G02B 5/20; G02B 5/26; G02B 5/28
USPC ....................................................... 250/226
See application file for complete search history.

(56) References Cited

U.S. PATENT DOCUMENTS

| 3,914,023 | A | * | 10/1975 | Thelen | G02B 5/285 |
| | | | | | 359/359 |
| 5,337,191 | A | | 8/1994 | Austin | |
| 7,133,197 | B2 | | 11/2006 | Ockenfuss et al. | |
| 9,448,346 | B2 | | 9/2016 | Ockenfuss | |
| 2006/0262389 | A1* | | 11/2006 | Zaczek | G02B 5/0825 |
| | | | | | 359/359 |
| 2007/0242359 | A1 | | 10/2007 | Thielsch et al. | |
| 2008/0057264 | A1 | | 3/2008 | Morimoto et al. | |

(Continued)

FOREIGN PATENT DOCUMENTS

JP    2005 258050 A    9/2005

OTHER PUBLICATIONS

Extended European Search Report corresponding to EP 18170860.3 dated Oct. 16, 2018, 9 pages.

*Primary Examiner* — Que Tan Le
(74) *Attorney, Agent, or Firm* — Harrity & Harrity, LLP

(57) ABSTRACT

An optical filter may include a first group of layers. The first group of layers may include alternating layers of a first dielectric material, of a group of dielectric materials, and a second dielectric material of the group of dielectric materials. The optical filter may include a second group of layers. The second group of layers may include alternating layers of a third dielectric material, of the group of dielectric materials, and a fourth dielectric material of the group of dielectric materials. The optical filter may include a third group of layers. The third group of layers may include alternating layers of a fifth dielectric material, of the group of dielectric materials, a sixth dielectric material, of the group of dielectric materials, and a metal material. The third group of layers may be disposed between the first group of layers and the second group of layers.

20 Claims, 24 Drawing Sheets

(56) References Cited

U.S. PATENT DOCUMENTS

2015/0029582 A1 1/2015 Chang et al.
2015/0369980 A1 12/2015 Ockenfuss et al.

* cited by examiner

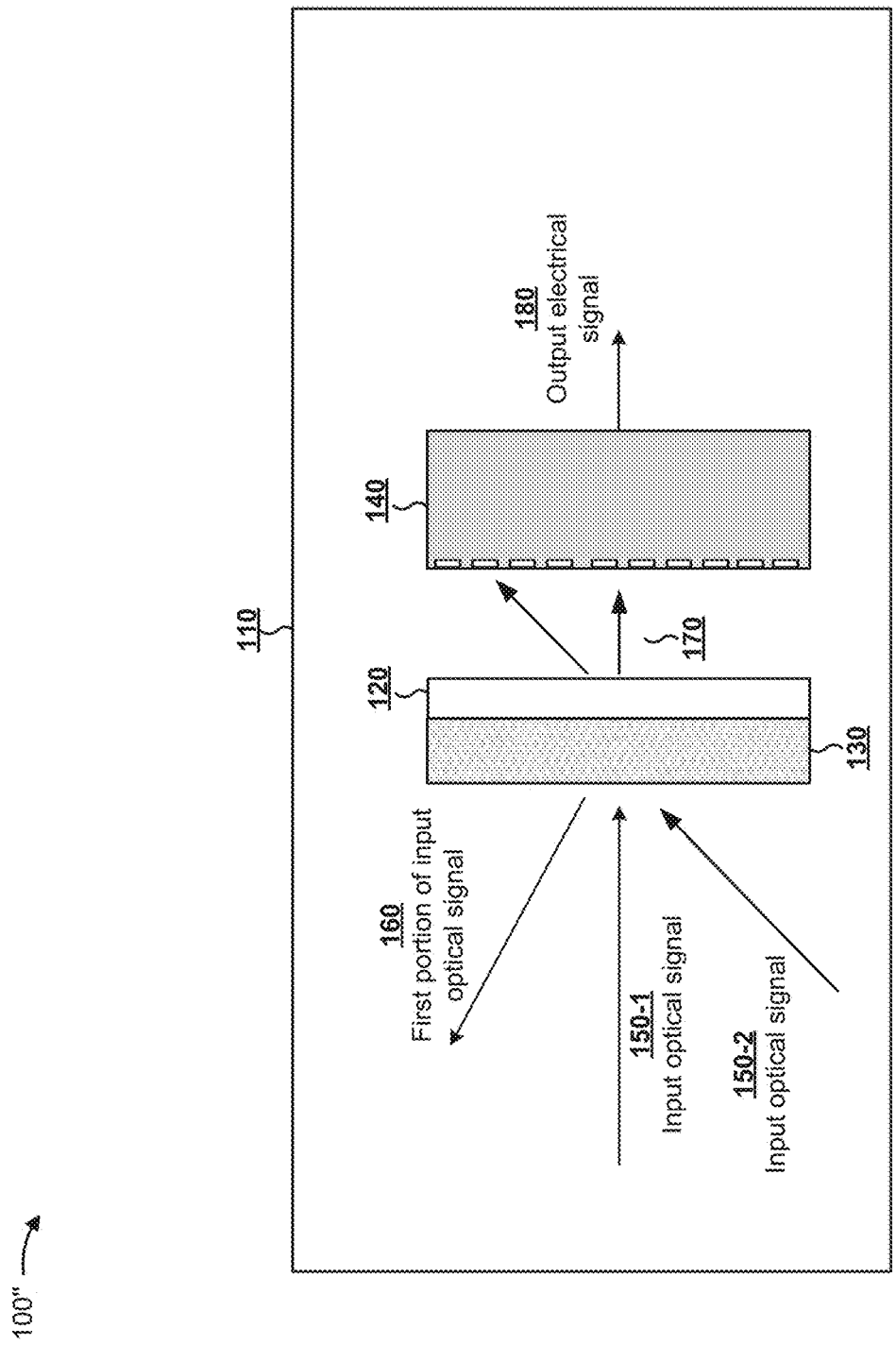

200 ⟶

| Layer # | material | thickness |
|---|---|---|
| substrate | Si3N4 | [nm] |
| 1 | NbTiO5 | 99.8 |
| 2 | SiO2 | 172.1 |
| 3 | NbTiO5 | 105.2 |
| 4 | SiO2 | 180.5 |
| 5 | NbTiO5 | 108.8 |
| 6 | SiO2 | 178.8 |
| 7 | NbTiO5 | 109.3 |
| 8 | SiO2 | 180.7 |
| 9 | NbTiO5 | 108.9 |
| 10 | SiO2 | 180.7 |
| 11 | NbTiO5 | 108.7 |
| 12 | SiO2 | 179.3 |
| 13 | NbTiO5 | 108.7 |
| 14 | SiO2 | 178.3 |
| 15 | NbTiO5 | 106.8 |
| 16 | SiO2 | 175.7 |
| 17 | NbTiO5 | 101.3 |
| 18 | SiO2 | 160.0 |
| 19 | NbTiO5 | 91.2 |
| 20 | SiO2 | 160.3 |
| 21 | NbTiO5 | 99.1 |
| 22 | SiO2 | 164.0 |
| 23 | NbTiO5 | 90.2 |
| 24 | SiO2 | 144.1 |
| 25 | NbTiO5 | 80.4 |
| 26 | SiO2 | 137.6 |
| 27 | NbTiO5 | 77.0 |
| 28 | SiO2 | 135.3 |
| 29 | NbTiO5 | 75.6 |
| 30 | SiO2 | 134.9 |
| 31 | NbTiO5 | 75.2 |
| 32 | SiO2 | 134.1 |
| 33 | NbTiO5 | 75.3 |
| 34 | SiO2 | 134.0 |
| 35 | NbTiO5 | 75.4 |
| 36 | SiO2 | 134.3 |
| 37 | NbTiO5 | 75.8 |
| 38 | SiO2 | 134.8 |
| 39 | NbTiO5 | 76.7 |
| 40 | SiO2 | 137.2 |
| 41 | NbTiO5 | 78.5 |
| 42 | SiO2 | 142.5 |
| 43 | NbTiO5 | 80.9 |
| 44 | SiO2 | 78.5 |
| exit media | air | |

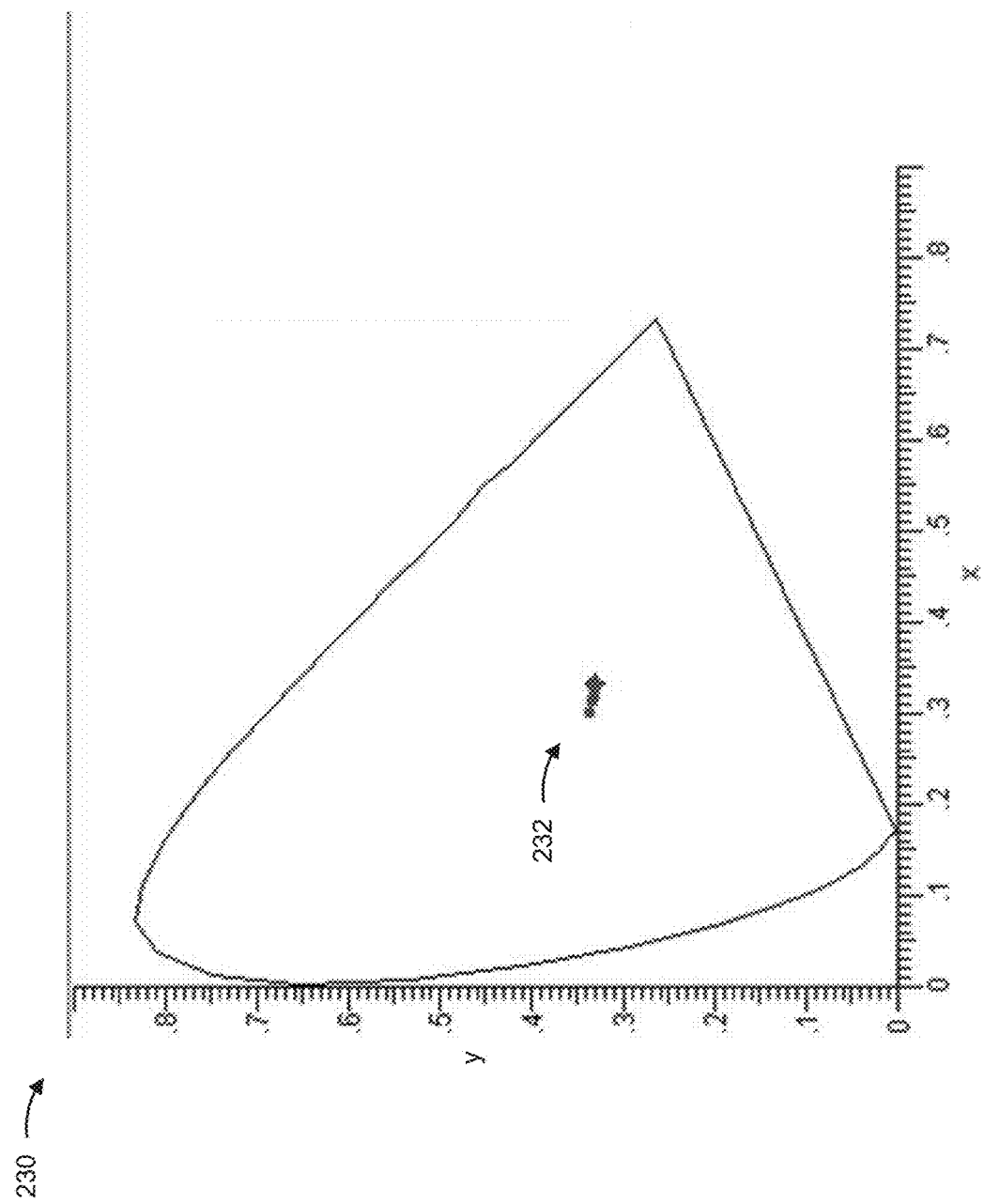

| Layer # | material | thickness [nm] |
|---|---|---|
| substrate | Si3N4 | |
| 1 | NbTiO5 | 28.0 |
| 2 | ZnO | 2.0 |
| 3 | Ag | 11.3 |
| 4 | ZnO | 2.0 |
| 5 | NbTiO5 | 53.8 |
| 6 | ZnO | 2.0 |
| 7 | Ag | 13.8 |
| 8 | ZnO | 2.0 |
| 9 | NbTiO5 | 53.1 |
| 10 | ZnO | 2.0 |
| 11 | Ag | 16.6 |
| 12 | ZnO | 2.0 |
| 13 | NbTiO5 | 50.7 |
| 14 | ZnO | 2.0 |
| 15 | Ag | 10.2 |
| 16 | ZnO | 2.0 |
| 17 | NbTiO5 | 132.1 |
| exit media | air | |

| Layer # | material | thickness |
|---|---|---|
| substrate | Si3N4 | [nm] |
| 1 | NbTiO5 | 95.5 |
| 2 | SiO2 | 48.3 |
| 3 | NbTiO5 | 12.7 |
| 4 | SiO2 | 63.3 |
| 5 | NbTiO5 | 116.3 |
| 6 | SiO2 | 25.2 |
| 7 | NbTiO5 | 139.1 |
| 8 | ZnO | 2.0 |
| 9 | Ag | 9.9 |
| 10 | ZnO | 2.0 |
| 11 | NbTiO5 | 51.9 |
| 12 | ZnO | 2.0 |
| 13 | Ag | 16.3 |
| 14 | ZnO | 2.0 |
| 15 | NbTiO5 | 53.4 |
| 16 | ZnO | 2.0 |
| 17 | Ag | 15.8 |
| 18 | ZnO | 2.0 |
| 19 | NbTiO5 | 53.1 |
| 20 | ZnO | 2.0 |
| 21 | Ag | 9.9 |
| 22 | ZnO | 2.0 |
| 23 | NbTiO5 | 72.7 |
| 24 | SiO2 | 1.7 |
| 25 | NbTiO5 | 50.8 |
| 26 | SiO2 | 164.1 |
| 27 | NbTiO5 | 97.4 |
| 28 | SiO2 | 58.8 |
| 29 | NbTiO5 | 9.8 |
| 30 | SiO2 | 59.2 |
| 31 | NbTiO5 | 94.9 |
| 32 | SiO2 | 76.6 |
| exit media | air | |

410 — (table label); braces indicate 412 (layers 1–6), 414 (layers 7–22), 416 (layers 23–32).

| Layer # | material | thickness [nm] |
|---|---|---|
| substrate | Si3N4 | |
| 1 | SiO2 | 169.5 |
| 2 | NbTiO5 | 95.1 |
| 3 | SiO2 | 26.0 |
| 4 | NbTiO5 | 19.0 |
| 5 | SiO2 | 31.3 |
| 6 | NbTiO5 | 94.4 |
| 7 | SiO2 | 16.3 |
| 8 | NbTiO5 | 22.2 |
| 9 | SiO2 | 27.6 |
| 10 | NbTiO5 | 134.2 |
| 11 | ZnO | 2.0 |
| 12 | Ag | 11.8 |
| 13 | ZnO | 2.0 |
| 15 | NbTiO5 | 52.3 |
| 16 | ZnO | 2.0 |
| 17 | Ag | 15.5 |
| 18 | ZnO | 2.0 |
| 20 | NbTiO5 | 53.1 |
| 21 | ZnO | 2.0 |
| 22 | Ag | 12.2 |
| 23 | ZnO | 2.0 |
| 25 | NbTiO5 | 129.8 |
| 26 | SiO2 | 161.0 |
| 27 | NbTiO5 | 92.0 |
| 28 | SiO2 | 159.2 |
| 29 | NbTiO5 | 93.8 |
| 30 | SiO2 | 73.5 |
| exit media | air | |

510 — layers 1–10: 512; layers 11–23: 514; layers 25–30: 516

FIG. 5A

| layer # | material | thickness [nm] |
|---|---|---|
| entrance medium | Si3N4 | |
| 1 | NbTiO5 | 101.3722 |
| 2 | SiO2 | 178.5148 |
| 3 | NbTiO5 | 121.1471 |
| 4 | SiO2 | 188.9079 |
| 5 | NbTiO5 | 123.6429 |
| 6 | SiO2 | 193.0840 |
| 7 | NbTiO5 | 120.7057 |
| 8 | SiO2 | 163.2265 |
| 9 | NbTiO5 | 104.3593 |
| 10 | SiO2 | 184.6303 |
| 11 | NbTiO5 | 113.9985 |
| 12 | SiO2 | 189.0945 |
| 13 | NbTiO5 | 103.5926 |
| 14 | SiO2 | 184.4878 |
| 15 | NbTiO5 | 100.8384 |
| 16 | SiO2 | 181.5068 |
| 17 | NbTiO5 | 119.5891 |
| 18 | SiO2 | 166.8945 |
| 19 | NbTiO5 | 108.9438 |
| 20 | SiO2 | 162.7463 |
| 21 | NbTiO5 | 96.59057 |
| 22 | SiO2 | 158.4722 |
| 23 | NbTiO5 | 102.0726 |
| 24 | SiO2 | 135.7411 |
| 25 | NbTiO5 | 75.75209 |
| 26 | SiO2 | 153.1318 |
| 27 | NbTiO5 | 77.12584 |
| 28 | SiO2 | 165.8563 |
| 29 | NbTiO5 | 89.27684 |
| 30 | SiO2 | 133.716 |
| 31 | NbTiO5 | 101.3882 |
| 32 | SiO2 | 141.2259 |
| 33 | NbTiO5 | 84.22379 |
| 34 | SiO2 | 139.3229 |
| 35 | NbTiO5 | 65.88022 |
| 36 | SiO2 | 133.0357 |
| 37 | NbTiO5 | 101.6078 |
| 38 | SiO2 | 140.4364 |
| 39 | NbTiO5 | 75.26797 |
| 40 | SiO2 | 135.3618 |
| 41 | NbTiO5 | 67.03955 |
| 42 | SiO2 | 103.3118 |
| 43 | NbTiO5 | 64.67312 |
| 44 | SiO2 | 111.3177 |
| 45 | NbTiO5 | 73.80789 |
| 46 | SiO2 | 120.2145 |
| 47 | NbTiO5 | 66.48728 |
| 48 | SiO2 | 103.7685 |
| 49 | NbTiO5 | 59.38034 |
| 50 | SiO2 | 109.7655 |
| 51 | NbTiO5 | 75.30574 |
| 52 | SiO2 | 122.8626 |
| 53 | NbTiO5 | 68.29442 |
| 54 | SiO2 | 94.23718 |
| 55 | NbTiO5 | 54.24409 |
| 56 | SiO2 | 117.3016 |
| 57 | NbTiO5 | 80.85207 |
| 58 | SiO2 | 132.7389 |
| 59 | NbTiO5 | 60.7624 |
| 60 | SiO2 | 87.33624 |
| 61 | NbTiO5 | 39.85941 |
| 62 | SiO2 | 62.54093 |
| 63 | NbTiO5 | 38.0491 |
| 64 | SiO2 | 65.15651 |
| 65 | NbTiO5 | 41.44068 |
| 66 | SiO2 | 71.38425 |
| 67 | NbTiO5 | 45.54467 |
| 68 | SiO2 | 74.48081 |
| 69 | NbTiO5 | 42.83867 |
| 70 | SiO2 | 67.87901 |
| 71 | NbTiO5 | 39.95258 |
| 72 | SiO2 | 64.41866 |
| 73 | NbTiO5 | 40.94706 |
| 74 | SiO2 | 72.9029 |
| 75 | NbTiO5 | 43.66155 |
| 76 | SiO2 | 71.85895 |
| 77 | NbTiO5 | 40.80151 |
| 78 | SiO2 | 45.44424 |
| 79 | NbTiO5 | 44.50196 |
| 80 | SiO2 | 132.1324 |
| exit medium | air | |

FIG. 7A

| layer # | material | thickness [nm] |
|---|---|---|
| entrance medium | Si3N4 | |
| 1 | NbTiO5 | 49.9786 |
| 2 | ZnO | 2 |
| 3 | Ag | 25.1725 |
| 4 | ZnO | 2 |
| 5 | NbTiO5 | 64.3768 |
| 6 | ZnO | 2 |
| 7 | Ag | 36.6817 |
| 8 | ZnO | 2 |
| 9 | NbTiO5 | 176.9518 |
| 10 | ZnO | 2 |
| 11 | Ag | 20.5595 |
| 12 | ZnO | 2 |
| 13 | NbTiO5 | 145.1848 |
| exit medium | air | |

| layer # | material | thickness [nm] |
|---|---|---|
| entrance medium | | |
| 1 | Si3N4 | 32.9427 |
| 2 | NbTiO5 | 40.51529 |
| 3 | SiO2 | 5.6656 |
| 4 | NbTiO5 | 128.8669 |
| 5 | SiO3 | 69.03001 |
| 6 | NbTiO5 | 64.89786 |
| 7 | SiO2 | 30.79714 |
| 8 | NbTiO5 | 52.48382 |
| 9 | SiO2 | 29.5847 |
| 10 | NbTiO5 | 71.12218 |
| 11 | SiO2 | 73.74213 |
| 12 | NbTiO5 | 69.43324 |
| 13 | SiO2 | 48.11909 |
| 14 | ZnO | 2 |
| 15 | Ag | 20.12676 |
| 16 | ZnO | 2 |
| 17 | NbTiO5 | 68.68239 |
| 18 | ZnO | 2 |
| 19 | Ag | 33.57801 |
| 20 | ZnO | 2 |
| 21 | NbTiO5 | 172.4038 |
| 22 | ZnO | 2 |
| 23 | Ag | 20.21844 |
| 24 | ZnO | 2 |
| 25 | NbTiO5 | 41.54023 |
| 26 | SiO2 | 32.23493 |
| 27 | NbTiO5 | 60.32596 |
| 28 | SiO2 | 31.36405 |
| 29 | NbTiO5 | 42.88839 |
| 30 | SiO2 | 61.04701 |
| 31 | NbTiO5 | 103.1638 |
| 32 | SiO2 | 34.28876 |
| 33 | NbTiO5 | 43.06593 |
| 34 | SiO3 | 27.94947 |
| 35 | NbTiO5 | 107.891 |
| 36 | SiO2 | 26.41392 |
| 37 | NbTiO5 | 111.111 |
| exit medium | air | |

INDUCED TRANSMISSION FILTER HAVING PLURAL GROUPS OF ALTERNATING LAYERS OF DIELECTRIC MATERIAL FOR FILTERING LIGHT WITH LESS THAN A THRESHOLD ANGLE SHIFT

BACKGROUND

An optical sensor device may be utilized to capture information. For example, the optical sensor device may capture information relating to a set of electromagnetic frequencies. The optical sensor device may include a set of sensor elements (e.g., optical sensors, spectral sensors, and/or image sensors) that capture the information. For example, an array of sensor elements may be utilized to capture information relating to multiple frequencies. In one example, an array of sensor elements may be utilized to capture information regarding a set of color bands of light, such as a first sensor element, of the sensor element array, capturing information regarding a red band of light; a second sensor element, of the sensor element array, capturing information regarding a green band of light; a third sensor element, of the sensor element array, capturing information regarding a blue band of light, or the like.

A sensor element, of the sensor element array, may be associated with a filter. The filter may include a passband associated with a first spectral range of light that is passed to the sensor element. The filter may be associated with blocking a second spectral range of light from being passed to the sensor element. In one example, a sensor element array may be associated with a filter including different color passbands, such as a red passband, a blue passband, a green passband, or the like (e.g., a red-green-blue (RGB) filter). In other examples, a sensor element array be associated with a near infrared (NIR) blocking filter, an infrared (IR) blocking filter, a long wave pass (LWP) filter, a short wave pass (SWP) filter, a photopic filter, a tristimulus filter, or the like.

SUMMARY

According to some possible implementations, an optical filter may include a first group of layers. The first group of layers may include alternating layers of a first dielectric material, of a group of dielectric materials, and a second dielectric material of the group of dielectric materials. The optical filter may include a second group of layers. The second group of layers may include alternating layers of a third dielectric material, of the group of dielectric materials, and a fourth dielectric material of the group of dielectric materials. The optical filter may include a third group of layers. The third group of layers may include alternating layers of a fifth dielectric material, of the group of dielectric materials, a sixth dielectric material, of the group of dielectric materials, and a metal material. The third group of layers may be disposed between the first group of layers and the second group of layers.

According to some possible implementations, an induced transmission filter may include a first all-dielectric portion including a first set of dielectric layers. The induced transmission filter may include a second all-dielectric portion including a second set of dielectric layers. The induced transmission filter may include a metal/dielectric portion including a third set of dielectric layers and one or more metal layers. The metal/dielectric portion may be disposed between the first all-dielectric portion and the second all-dielectric portion.

According to some possible implementations, a mixed metal/dielectric optical filter may include a substrate. The mixed metal/dielectric optical filter may include a first all-dielectric portion including alternating silicon dioxide layers and niobium titanium oxide layers. The mixed metal/dielectric optical filter may include a second all-dielectric portion including alternating silicon dioxide layers and niobium titanium oxide layers. The mixed metal/dielectric optical filter may include a metal/dielectric portion including one or more layer groups. A layer group, of the one or more layer groups, may include a silver layer, two zinc oxide layers, and two niobium titanium oxide layers. The silver layer may be disposed between the two zinc oxide layers. The two zinc oxide layers may be disposed between the two niobium titanium oxide layers. The metal/dielectric portion may be disposed between the first all-dielectric portion and the second all-dielectric portion.

BRIEF DESCRIPTION OF THE DRAWINGS

FIGS. 1A-1C are diagrams of an overview of an example implementation described herein;

FIGS. 2A-2C are diagrams of characteristics of an all-dielectric optical filter described herein;

FIGS. 3A-3C are diagrams of characteristics of a low angle shift induced transmission optical filter (ITF) described herein;

FIGS. 4A-4C are diagrams of characteristics of a mixed metal/dielectric optical filter described herein;

FIGS. 5A-5C are diagrams of characteristics of a mixed metal/dielectric optical filter described herein;

FIGS. 7A-7G are diagrams of characteristics of a set of optical filters described herein.

DETAILED DESCRIPTION

Figure 1A:
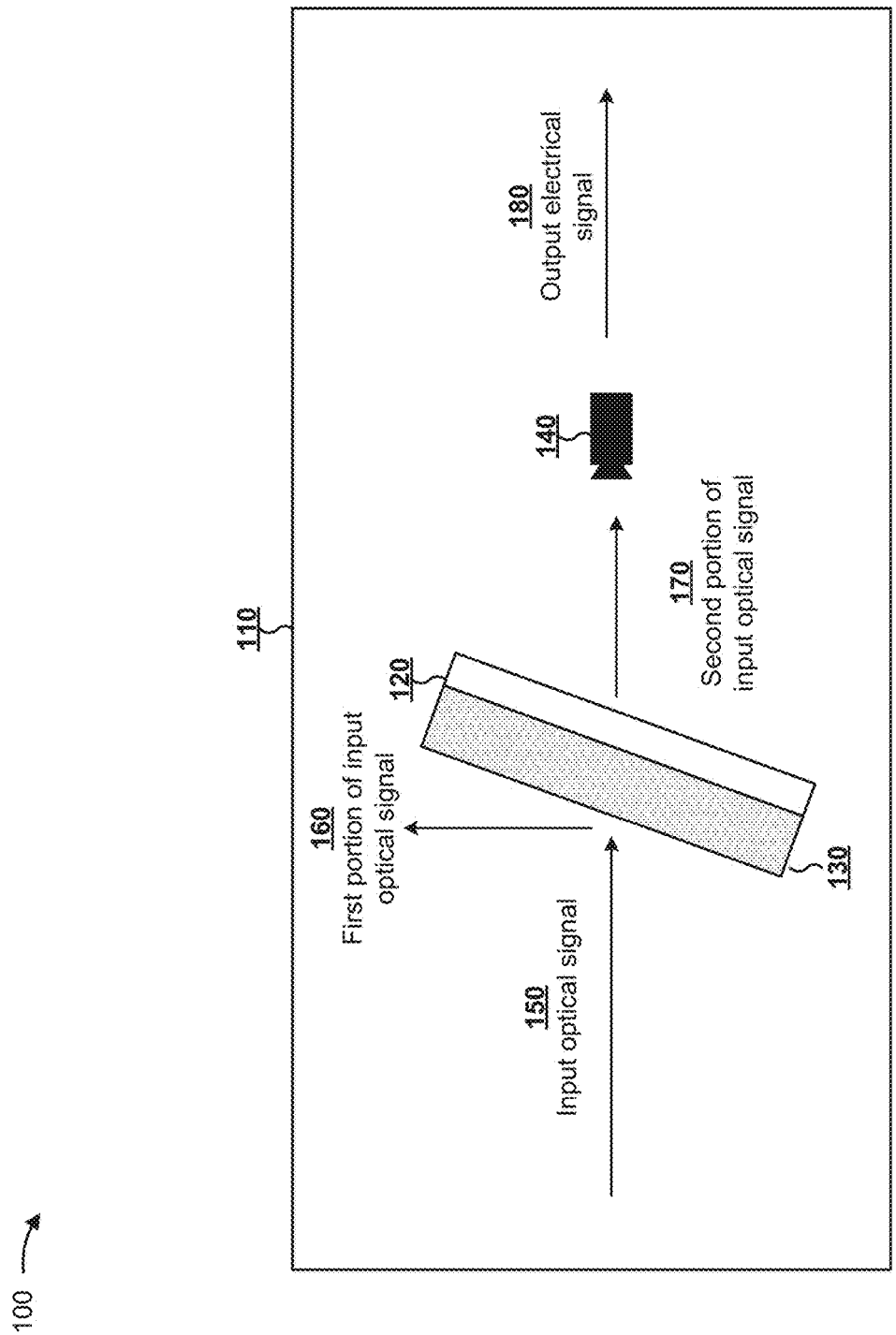

The following detailed description of example implementations refers to the accompanying drawings. The same reference numbers in different drawings may identify the same or similar elements.

An optical sensor device may include a sensor element array of sensor elements to receive light initiating from an optical source, such as an optical transmitter, a light bulb, an ambient light source, or the like. The optical sensor device may utilize one or more sensor technologies, such as a complementary metal-oxide-semiconductor (CMOS) technology, a charge-coupled device (CCD) technology, or the like. A sensor element (e.g., an optical sensor), of the optical sensor device, may obtain information (e.g., spectral data) regarding a set of electromagnetic frequencies.

A sensor element may be associated with a filter that filters light to the sensor element to enable the sensor element to obtain information regarding a particular spectral range of electromagnetic frequencies. For example, the sensor element may be aligned with a red-green-blue (RGB) filter, a near infrared (NIR) blocking filter, an infrared (IR) blocking filter, a long wave pass (LWP) filter, a short wave pass (SWP) filter, a photopic filter, a tristimulus filter, or the like to cause a portion of light that is directed toward the sensor element to be filtered. A filter may include sets of dielectric layers to filter the portion of the light. For example, a filter may include dielectric filter stacks of alternating high-index layers and low-index layers, such as alternating layers of niobium titanium oxide ($NbTiO_x$) and silicon dioxide ($SiO_2$). However, all-dielectric types of filters may be associated with a threshold angle shift at increasing angles of incidence. For example, an all-dielectric filter may be associated with an angle shift of greater than approximately 10 nm at an angle of incidence of 20 degrees, greater than approximately 20 nm at an angle of incidence of 30 degrees, greater than approximately 40 nm at an angle of incidence of 40 degrees, greater than approximately 50 nm at an angle of incidence of 50 degrees, or the like.

A low angle shift (LAS) filter with alternating layers of high-index dielectric, low-index dielectric, and metal may be selected to reduce an angle shift relative to an all-dielectric filter. For example, a low angle shift filter may utilize layers of niobium titanium oxide, zinc oxide, and silver to reduce an angle shift relative to an all-dielectric filter. However, the low angle shift filter may be associated with a transmissivity in a passband of the low angle shift filter that does not satisfy a threshold. For example, a low angle shift filter may be associated with a transmissivity of less than approximately 70% at a range of angles of incidence from 0 degrees to 50 degrees.

Some implementations, described herein, provide a mixed dielectric/metal filter with portions of alternating dielectric layers sandwiching a portion of dielectric layers and metal layers. For example, an optical filter may include a first portion with a set of alternating high-index layers of niobium titanium oxide and low-index layers of silicon dioxide, a second portion with another set of alternating high-index layers of niobium titanium oxide and low-index layers of silicon dioxide, and a third portion, disposed between the first portion and the second portion, of alternating layers of high-index layers of niobium titanium oxide, low-index layers of zinc oxide, and metal layers of silver. In this way, the filter may filter light with less than a threshold angle shift and with greater than a threshold level of transmission. For example, a mixed dielectric/metal filter may be associated with an angle shift of less than approximately 30 nm at angles of incidence from 0 degrees to 50 degrees, an angle shift of less than approximately 20 nm at angles of incidence from 0 degrees to 40 degrees, an angle shift of less than approximately 10 nm at angles of incidence from 0 degrees to 20 degrees, or the like. Similarly, a mixed dielectric/metal filter may be associated with a transmissivity of greater than approximately 70% at angles of incidence from 0 degrees to 50 degrees, greater than approximately 75% at angles of incidence from 0 degrees to 50 degrees, or the like.

Figure 1B:
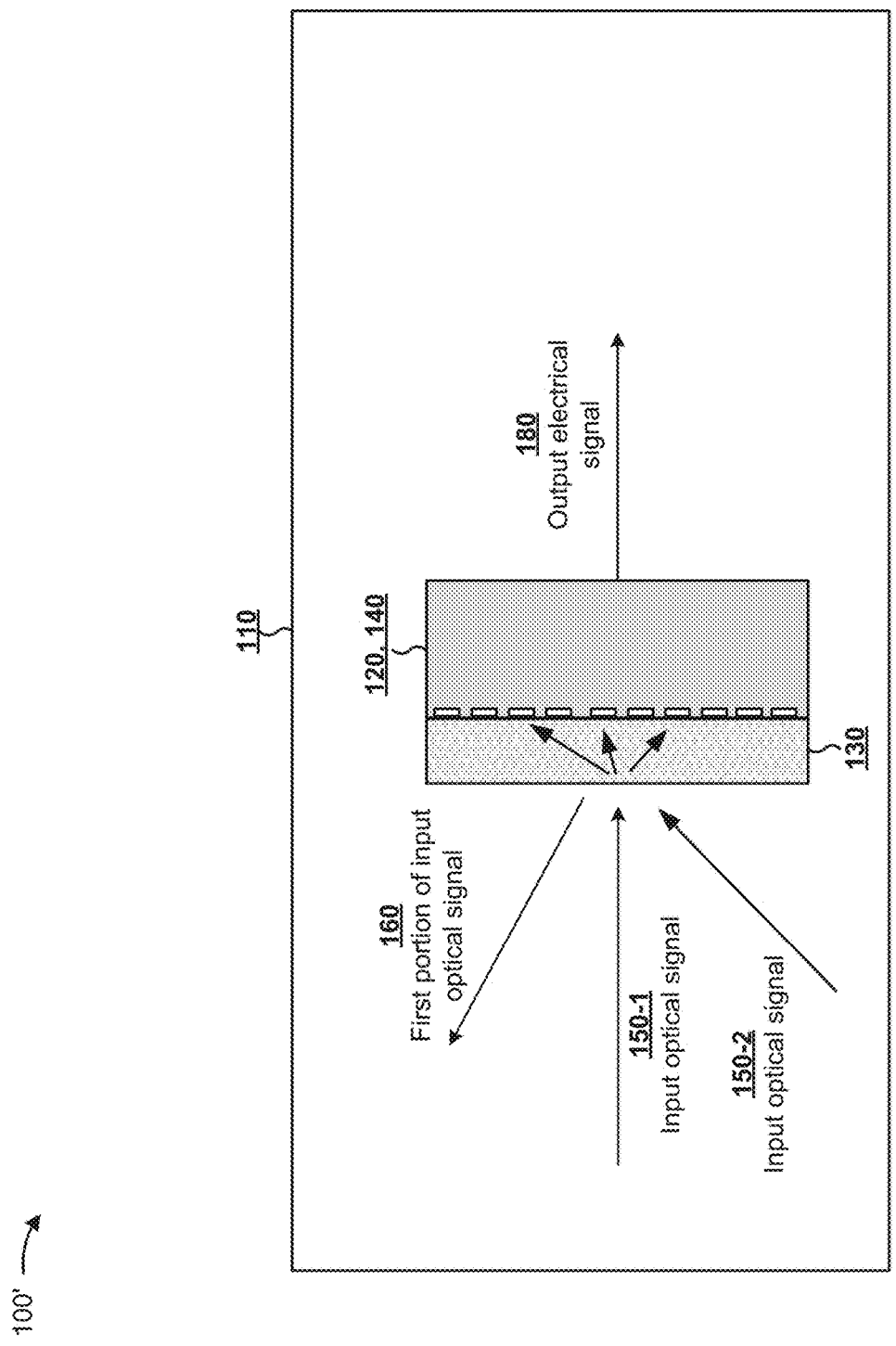

FIGS. 1A-1C are diagrams of an overview of example implementations 100/100'/100" described herein. As shown in FIG. 1A, example implementation 100 includes a sensor system 110. Sensor system 110 may be a portion of an optical system, and may provide an electrical output corresponding to a sensor determination. Sensor system 110 includes an optical filter structure 120, which includes an optical filter 130, and an optical sensor 140. For example, optical filter structure 120 may include an optical filter 130 that performs a passband filtering functionality. In another example, an optical filter 130 may be aligned to an array of sensor elements of optical sensor 140.

Although implementations, described herein, may be described in terms of an optical filter in a sensor system, implementations described herein may be used in another type of system, may be used external to a sensor system, or the like.

As further shown in FIG. 1A, and by reference number 150, an input optical signal is directed toward optical filter structure 120. The input optical signal may include but is not limited to visible spectrum (VIS) and NIR light (e.g., ambient light from the environment in which sensor system 110 is being utilized). In another example, the optical transmitter may direct another spectral range of light for another functionality, such as a testing functionality, a measurement functionality, a communications functionality, or the like.

As further shown in FIG. 1A, and by reference number 160, a first portion of the optical signal with a first spectral range is not passed through by optical filter 130 and optical filter structure 120. For example, dielectric filter stacks, which may include high-index material layers and low-index material layers, and silver/dielectric filter stacks of optical filter 130, may cause the first portion of light to be reflected in a first direction, to be absorbed, or the like. As shown by reference number 170, a second portion of the optical signal is passed through by optical filter 130 and optical filter structure 120. For example, optical filter 130 may pass through the second portion of light with a second spectral range in a second direction toward optical sensor 140.

As further shown in FIG. 1A, and by reference number 180, based on the second portion of the optical signal being passed to optical sensor 140, optical sensor 140 may provide an output electrical signal for sensor system 110, such as for use in imaging, ambient light sensing, detecting the presence of an object, performing a measurement, facilitating communication, or the like. In some implementations, another arrangement of optical filter 130 and optical sensor 140 may be utilized. For example, rather than passing the second portion of the optical signal collinearly with the input optical signal, optical filter 130 may direct the second portion of the optical signal in another direction toward a differently located optical sensor 140.

As shown in FIG. 1B, a similar example implementation 100' includes a set of sensor elements of a sensor element array 140 is integrated into a substrate 120 of an optical filter structure. In this case, optical filter 130 is disposed onto substrate 120. Input optical signals 150-1 and 150-2 are received at a set of angles and a first portion of input optical signals 150-1 and 150-2 is reflected at another set of angles. In this case, a second portion of input optical signals 150-1 and 150-2 is passed through optical filter 130 to sensor element array 140, which provides an output electrical signal 180.

As shown in FIG. 1C, another similar example implementation 100" includes a set of sensor elements of a sensor element array 140 separated from an optical filter structure 120, and optical filter 130 is disposed onto optical filter structure 130. In this case, optical filter structure 130 and sensor element array 140 may be separated by free space or the like. Input optical signals 150-1 and 150-2 are received at a set of angles at optical filter 130. A first portion 160 of the input optical signals 150-1 and 150-2 is reflected and a second portion 170 is passed by optical filter 130 and optical filter structure 120 to sensor element array 140, which provides an output electrical signal 180.

As indicated above, FIGS. 1A-1C are provided merely as examples. Other examples are possible and may differ from what was described with regard to FIGS. 1A-1C.

Figure 2B:
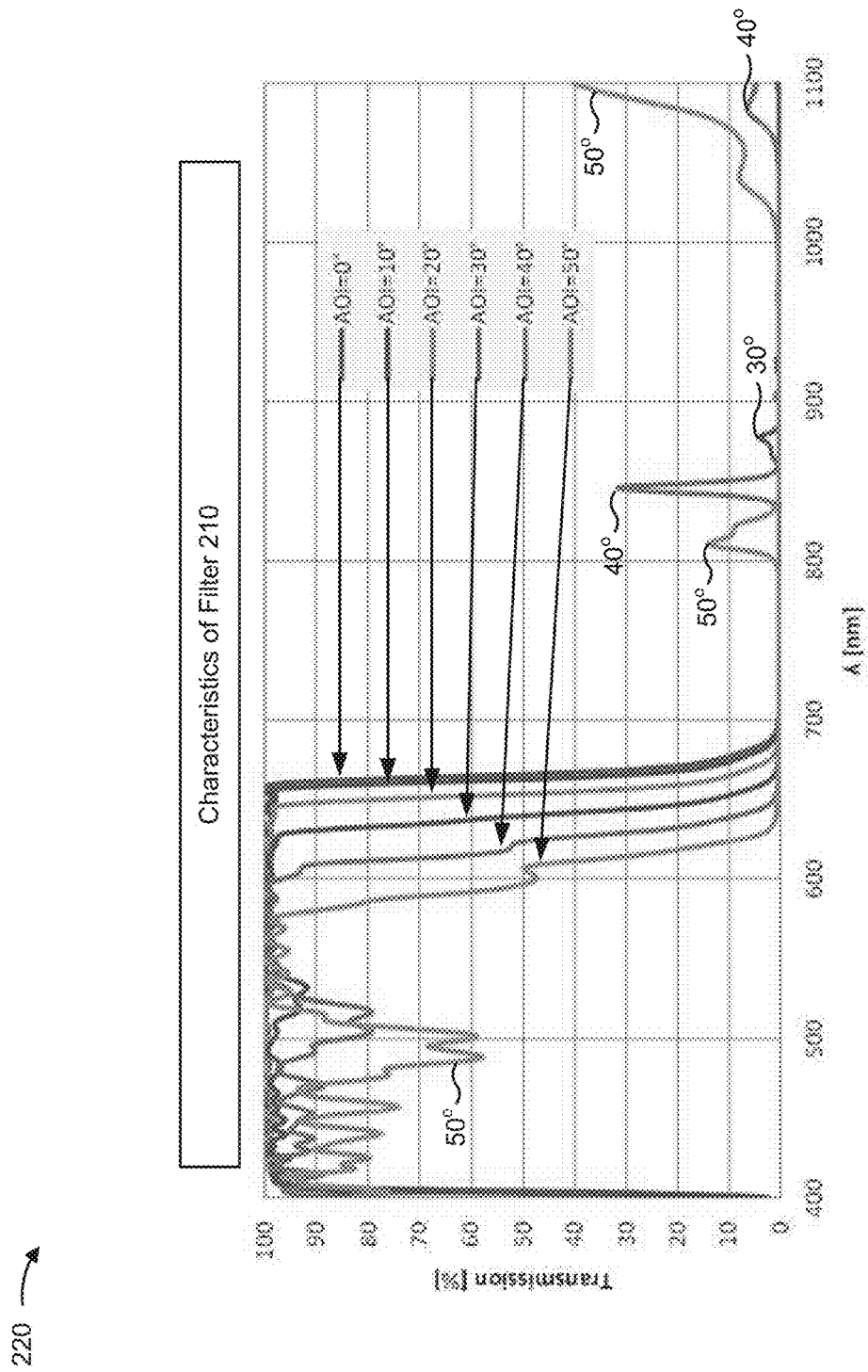

FIGS. 2A-2C are diagrams of characteristics relating to an optical filter. FIGS. 2A-2C show an example of an all-dielectric filter.

As shown in FIG. 2A, and by chart 200, a filter 210 may include a substrate and a set of dielectric stacks. The substrate may include a silicon nitride ($Si_3N_4$ and shown as Si3N4), a glass substrate, a polymer substrate, another transparent substrate, or the like. In some implementations, the substrate may be attached to the set of dielectric stacks using an epoxy (e.g., a transparent glue), an air gap (e.g., with an epoxy outside of an optical path), or the like. Additionally, or alternatively, the set of dielectric stacks may be disposed directly onto a detector, detector array, sensor element array, or the like, which may form the substrate for the set of dielectric stacks. For example, a sensor element array may include a top layer of silicon nitride to which the set of dielectric stacks may be attached. In another example, such as for a back-illuminated detector, another type of substrate may be used, such as a silicon substrate. In some implementations, the substrate may be an entrance medium, an exit medium, or the like for the set of dielectric stacks. The set of dielectric stacks includes alternating layers of niobium titanium oxide ($NbTiO_5$ and shown as NbTiO5) and silicon dioxide ($SiO_2$ and shown as SiO2). For example, filter 210 may include a first niobium titanium oxide layer with a thickness of 99.8 nanometers (nm) deposited onto the substrate and a first silicon dioxide layer with a thickness of 172.1 nm deposited onto the niobium titanium oxide layer. Similarly, filter 210 may include a second niobium titanium oxide layer deposited with a thickness of 105.2 nm deposited onto the first silicon dioxide layer and a second silicon dioxide layer with a thickness of 180.5 nm deposited onto the second niobium titanium oxide layer. In this case, filter 210 is associated with a total thickness of approximately 5.36 micrometers (μm), which may result in excessive deposition time and excessive cost relating to the increased deposition time. Moreover, the total thickness may result in a threshold amount of compressive stress, which may result in a warping of a substrate with less than a threshold thickness and which may result in excessive difficulty and yield loss when portioning a substrate onto which multiple filters are deposited to form multiple, discrete filters.

As shown in FIG. 2B, and by chart 220, a filter response for filter 210 exposed to an exit medium of air is provided. For example, filter 210 is associated with a cut-off wavelength (e.g., a wavelength at which a transmissivity of filter 210 reduces at a threshold rate) of approximately 660 nm at an angle of incidence (AOI) of 0 degrees. In contrast, at angles of incidence of 10 degrees, 20 degrees, 30 degrees, 40 degrees, and 50 degrees, filter 210 is associated with a threshold shift in the cut-off wavelength of approximately 5 nm, approximately 12 nm, approximately 25 nm, approximately 42 nm, and approximately 52 nm, respectively. Moreover, for angles of incidence of 30 degrees, 40 degrees, and 50 degrees, filter 210 is associated with a transmissivities of approximately 4% at approximately 880 nm, approximately 31% at approximately at approximately 850 nm, and approximately 14% at approximately 805 nm, respectively. Furthermore, filter 210 is associated with a drop in transmissivity to below a threshold transmissivity (e.g., to a transmissivity of between approximately 58% and approximately 68%) between approximately 480 nm and approximately 505 nm at an AOI of 50 degrees, and filter 210 is associated with an increase in transmissivity to greater than a threshold transmissivity (e.g., to a transmissivity greater than approximately 1%) at a spectral range greater than approximately 1000 nm for the AOI of 50 degrees. For a usage of filter 210 to provide a passband between approximately 420 nm and approximately 620 nm, the threshold angle shifts and the threshold transmissivity drops and increases result in relatively poor filter performance.

As shown in FIG. 2C, and by chart 230, a color plot for filter 210 is provided (e.g., an International Commission on Illumination (CIE) 1931 color plot). As shown by reference number 232, filter 210 is associated with a CIE color plot indicating a threshold color shift between approximately (0.33, 0.33) to approximately (0.30, 0.33) at a shift from a 0 degree AOI to a 50 degree AOI. The threshold color shift results in relatively poor filter performance.

As indicated above, FIGS. 2A-2C are provided merely as examples. Other examples are possible and may differ from what was described with regard to FIGS. 2A-2C.

Figure 3B:
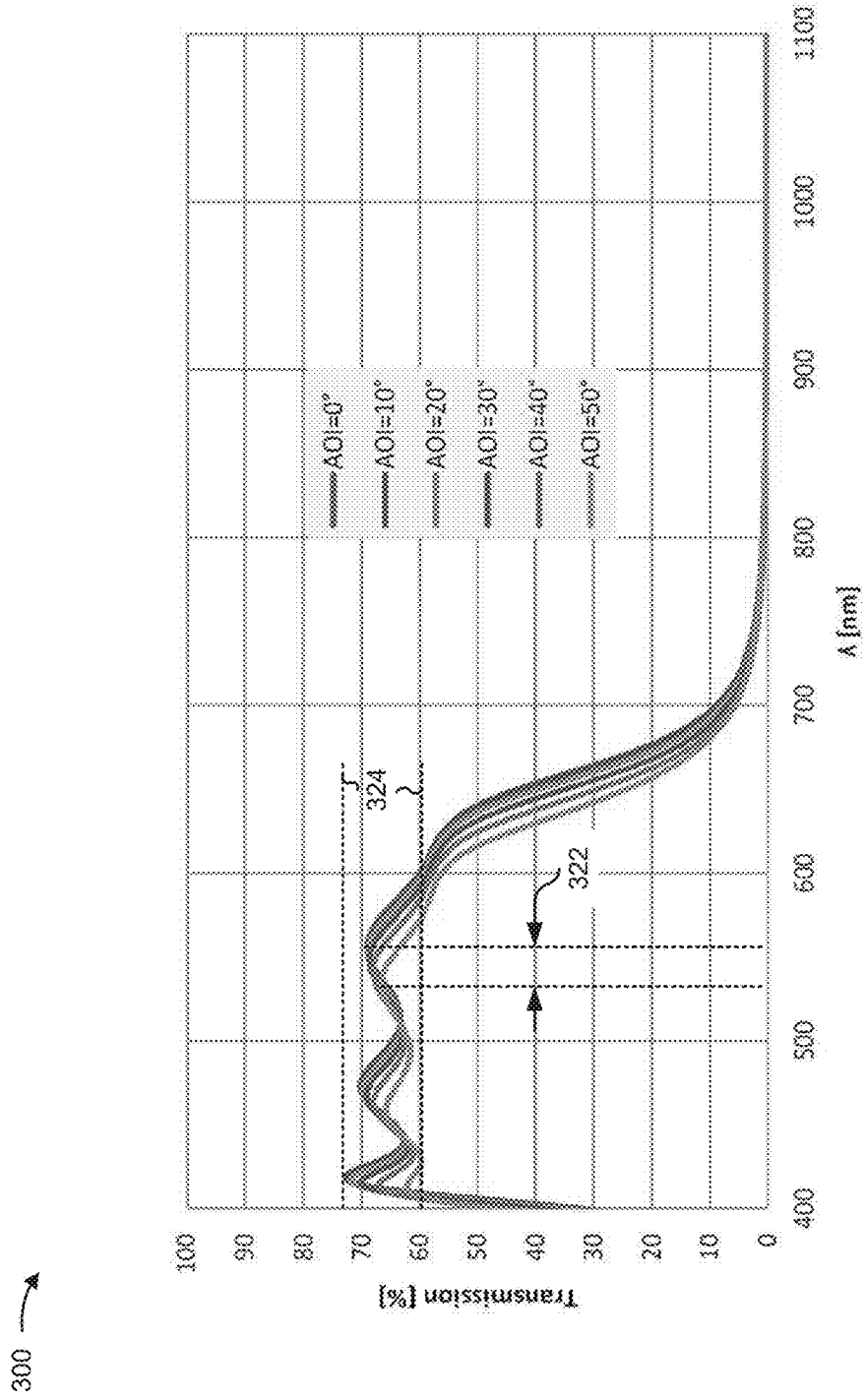
Figure 3C:
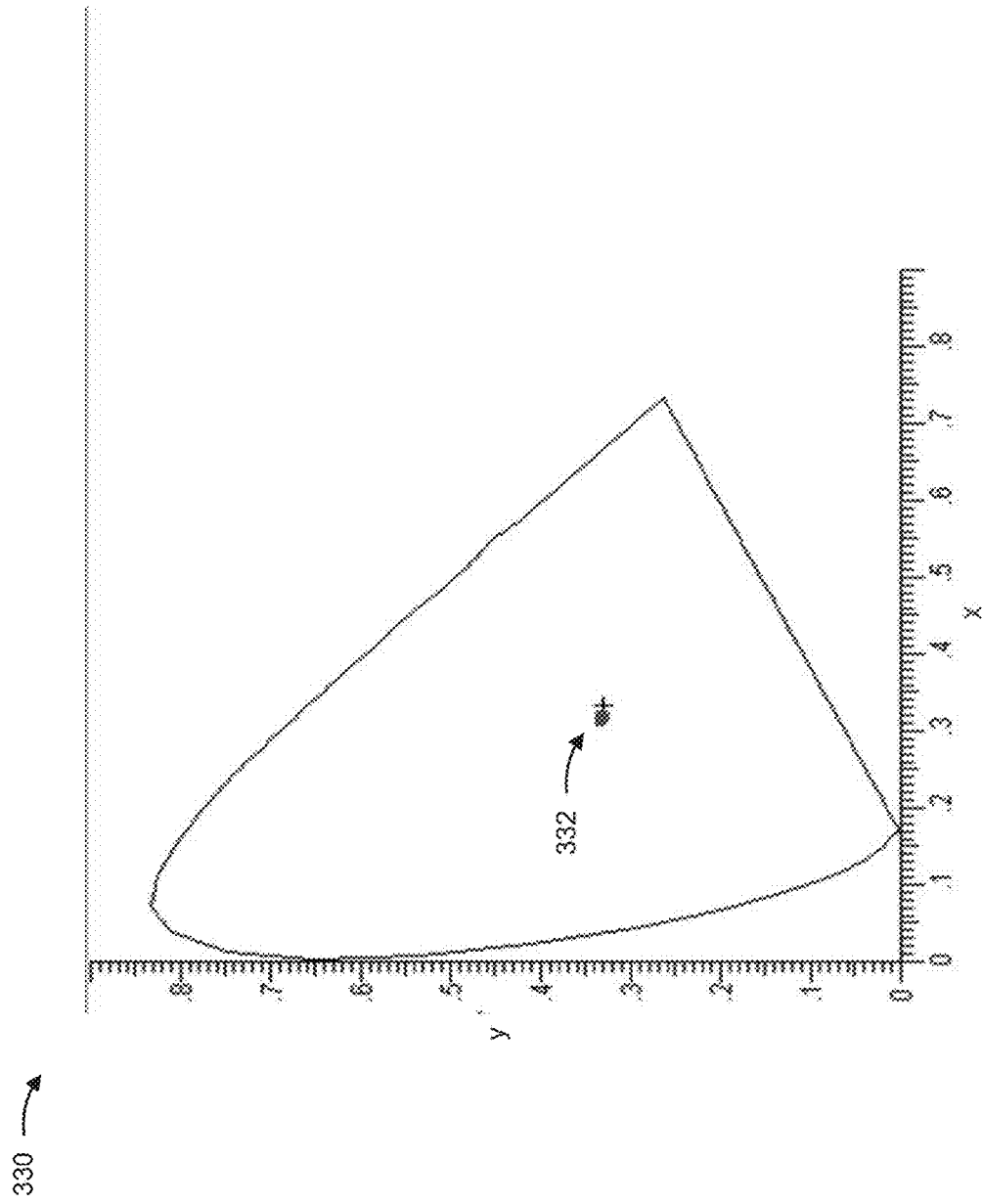

FIGS. 3A-3C are diagrams of characteristics relating to an optical filter. FIGS. 3A-3C show an example of a low angle shift induced transmission optical filter (ITF) with dielectric/metal filter stacks.

As shown in FIG. 3A, and by chart 300, a filter 310 may include a substrate, a set of dielectric layers, and a set of metal layers. The substrate may include a silicon nitride substrate. The set of dielectric layers and the set of metal layers include alternating layers of niobium titanium oxide, zinc oxide (ZnO), and silver (Ag). For example, a first layer of niobium titanium oxide with a thickness of 28.0 nm is deposited onto a silicon nitride substrate, a second layer of zinc oxide with a thickness of 2.0 nm is deposited onto the first layer, a third layer of silver with a thickness of 11.3 nm is deposited onto the second layer, a fourth layer of zinc oxide with a thickness of 2.0 nm is deposited onto the third layer, and a fifth layer of niobium titanium oxide with a thickness of 53.8 nm is deposited onto the fourth layer. In this case, the fifth layer of niobium titanium oxide may be multiple layers of niobium titanium oxide. In other words, a first portion of the fifth layer may be to sandwich the second layer through the fourth layer with the first layer, and a second portion of the fifth layer may be to sandwich a sixth layer through an eighth layer with a portion of a ninth layer. Although filter 310 is described with a particular set of layer thicknesses, other layer thicknesses are possible and may differ from what is shown in FIG. 3A.

As shown in FIG. 3B, and by chart 320, a filter response for filter 310 exposed to an exit medium of air is provided. As shown by reference number 322, filter 310 is associated with a reduced angle shift relative to filter 210. For example, filter 310 is associated with an angle shift of a cutoff wavelength of less than approximately 20 nm for a change in angle of incidence from 0 degrees to 10 degrees, 20 degrees, 30 degrees, 40 degrees, or 50 degrees compared with an angle shift of great than 20 nm for a change in angle of incidence from 0 degrees to 30 degrees, 40 degrees, or 50 degrees. However, as shown by reference number 324, filter 310 is associated with a reduced transmissivity relative to filter 210. For example, filter 310 is associated with an average transmissivity of between approximately 62% and 65% for angles of incidence between 0 degrees and 50 degrees in a spectral range of the passband of between approximately 420 nm and approximately 620 nm. In this case, a transmissivity in an infrared (IR) blocking spectral range of approximately 750 nm to approximately 1100 nm is approximately 0.41% for an AOI of 0 degrees and approximately 0.37% for an AOI of 40 degrees.

As shown in FIG. 3C, and by chart 330, a CIE 1931 color plot of filter 310 is provided. As shown by reference number 332, filter 310 is associated with a reduced color shift relative to filter 210 for a shift from a 0 degree angle of incidence to a 50 degree angle of incidence. For example, filter 310 is associated with a color shift less than a threshold (e.g., less than 0.2, less than 0.1, less than 0.05, etc.).

As indicated above, FIGS. 3A-3C are provided merely as examples. Other examples are possible and may differ from what was described with regard to FIGS. 3A-3C.

Figure 4B:
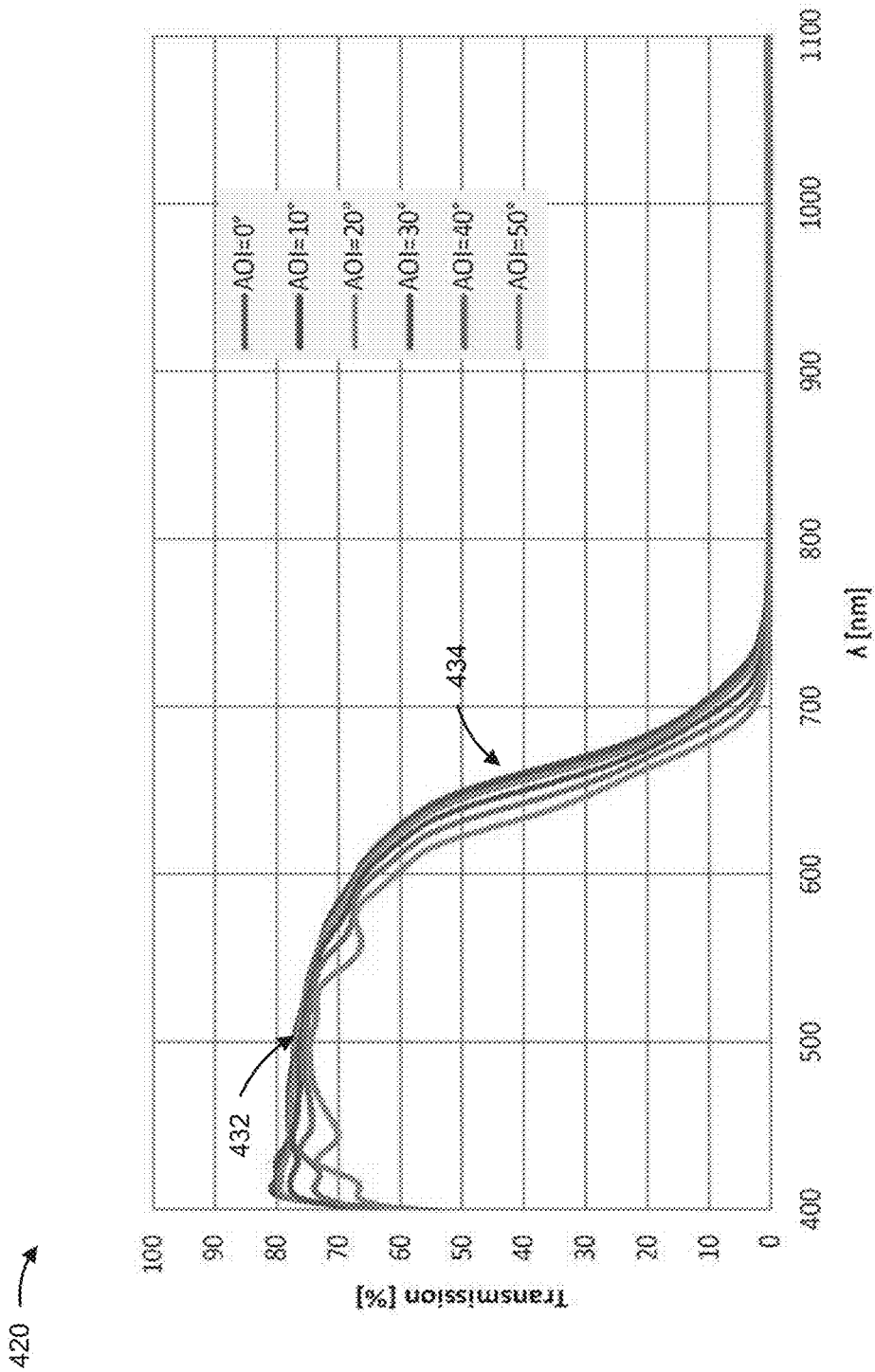
Figure 4C:
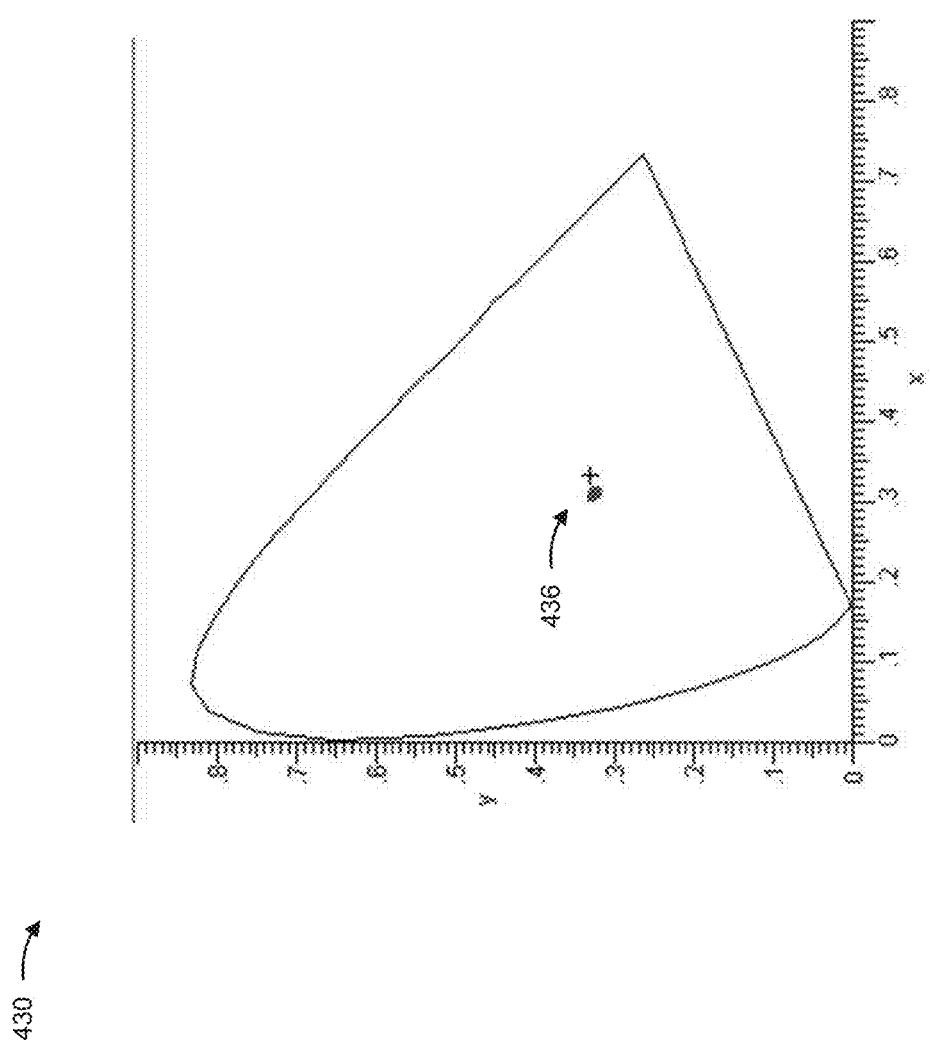

FIGS. 4A-4C are a diagram of characteristics relating to a mixed metal/dielectric optical filter. FIGS. 4A-4C show an example of an optical filter with dielectric filter stacks of high-index layers and low-index layers and with a metal (e.g., silver) dielectric filter stack disposed between the dielectric filter stacks.

As shown in FIG. 4A, and by chart 400, a filter 410 may include a substrate, a set of dielectric layers, and a set of metal layers. As shown by reference number 412, a first portion of filter 410 (e.g., a first all-dielectric portion) includes all-dielectric layers of alternating high-index layers and low-index layers. In this case, the alternating high-index layers and low-index layers are, respectively, niobium titanium oxide layers and silicon dioxide layers. For example, a first layer deposited onto the silicon nitride substrate is a niobium titanium oxide layer with a thickness of 95.5 nm (shown as layer 1), a second layer deposited onto the first layer is silicon dioxide with a thickness of 48.3 nm (shown as layer 2), etc. In some implementations, another type of substrate may be used, such as a glass substrate or the like. In some implementations, another high-index material may be used, such as a material with a refractive index greater than approximately 2.0, greater than approximately 2.5, greater than approximately 3.0, greater than approximately 3.5, greater than approximately 3.6, greater than approximately 3.7, etc. In some implementations, another low-index material may be used, such as a material with a refractive index less than approximately 3.0, less than approximately 2.5, less than approximately 2.0, less than approximately 1.5, etc. In some implementations, one or more layers may utilize, as a dielectric material, an oxide material, such as silicon dioxide ($SiO_2$), niobium pentoxide ($Nb_2O_5$), tantalum pentoxide ($Ta_2O_5$), titanium dioxide ($TiO_2$), aluminum oxide ($Al_2O_3$), zirconium oxide ($ZrO_2$), yttrium oxide ($Y_2O_3$), hafnium dioxide ($HfO_2$), or the like; a nitride material, such as silicon nitride (Si3N4); a fluoride material, such as magnesium fluoride (MgF); a sulfide material, such as zinc sulfide (ZnS); a selenide material, such as zinc selenide (ZnSe); a hydrogenated material, such as hydrogenated silicon or hydrogenated germanium; a nitrogenated material, such as nitrogenated germanium; a combination thereof; or the like.

As further shown in FIG. 4A, and by reference number 414, a second portion of filter 410 includes mixed metal/dielectric layers. In this case, the second portion of filter 410 includes multiple layer groups of one or more niobium titanium oxide layers, one or more zinc oxide layers, and one or more silver layers. For example, a first layer group (layers 7 to 11) includes a layer of niobium titanium oxide with a thickness of 139.1 nm (e.g., shown as layer 7, a first portion of which may be a part of the first portion of filter 410 and a second portion of which may be a part of the second portion of filter 410), a layer of zinc oxide with a thickness of 2.0 nm (shown as layer 8), a layer of silver with a thickness of 9.9 nm (shown as layer 9), a layer of zinc oxide with a thickness of 2.0 nm (shown as layer 10), and a layer of niobium titanium oxide with a thickness of 51.9 nm (shown as layer 11, a first portion of which may be a part of the first layer group, a second portion of which may be a part of a second layer group). Further to the example, a second layer group (layers 11 to 15), includes the second portion of layer 11 of niobium titanium oxide, layer 12 of zinc oxide, layer 13 of silver, layer 14 of zinc oxide, and a first portion of layer 15 of niobium titanium oxide (e.g., a second portion of which may be part of a third layer group). In another example, another metal material may be utilized.

As further shown in FIG. 4A, and by reference number 416, a third portion of filter 410 (e.g., a second all-dielectric portion) includes all-dielectric layers of alternating high-index layers and low-index layers. In this case, the alternating high-index layers and low-index layers are, respectively, niobium titanium oxide layers and silicon dioxide layers. For example, a first layer is a portion of layer 23 of niobium titanium oxide, a second layer is layer 24 of silicon dioxide, a third layer is layer 25 of niobium titanium oxide, a fourth layer is layer 26 of silicon dioxide, etc. In this case, filter 410 utilizes three different dielectric materials. In another example, filter 410 may utilize two different dielectric materials. In some implementations, filter 410 may be matched to an exit medium of air. In some implementations, filter 410 may be matched to another exit medium, such as a polymer material, a color dye, an RGB dye, an epoxy material, a glass material, or the like. In some implementations, filter 410 may be an RGB filter (e.g., a filter with a passband corresponding to a red spectral range of light, a green spectral range of light, or a blue spectral range of light), an NIR blocker, an LWP filter, an SWP filter, a photopic filter, an ambient light sensor filter, a tri-stimulus filter, or the like. Although filter 410 is described with a particular set of layer thicknesses, other layer thicknesses are possible and may differ from what is shown in FIG. 4A.

As shown in FIG. 4B, and by chart 420; and in FIG. 4C, and by chart 430, filter 410 is associated with a reduced angle shift and color shift relative to filter 210 and an improved transmissivity relative to filter 310. For example, as shown by reference number 432 in FIG. 4B, filter 410 is associated with a transitivity of approximately 80/o at approximately 420 nm and an angle of incidence of 0 degrees, and is associated with a transmissivity greater than 70% for a spectral range of between approximately 420 nm and 550 nm for angles of incidence of between 0 degrees and 50 degrees. Similarly, as shown by reference number 434 in FIG. 4B, filter 410 is associated with an angle shift of less than approximately 40 nm for the spectral range of between approximately 400 nm and approximately 1100 nm and angles of incidence between 0 degrees and 50 degrees.

As shown in FIG. 4C, and by chart 430, a CIE 1931 color plot of filter 310 is provided. As shown by reference number 436, filter 410 is associated with a reduced color shift relative to filter 210 for a shift from a 0 degree angle of incidence to a 50 degree angle of incidence. For example, filter 410 is associated with a color shift less than a threshold (e.g., less than 0.2, less than 0.1, less than 0.05, etc.).

As indicated above, FIGS. 4A-4C are provided merely as examples. Other examples are possible and may differ from what was described with regard to FIGS. 4A-4C.

Figure 5B:
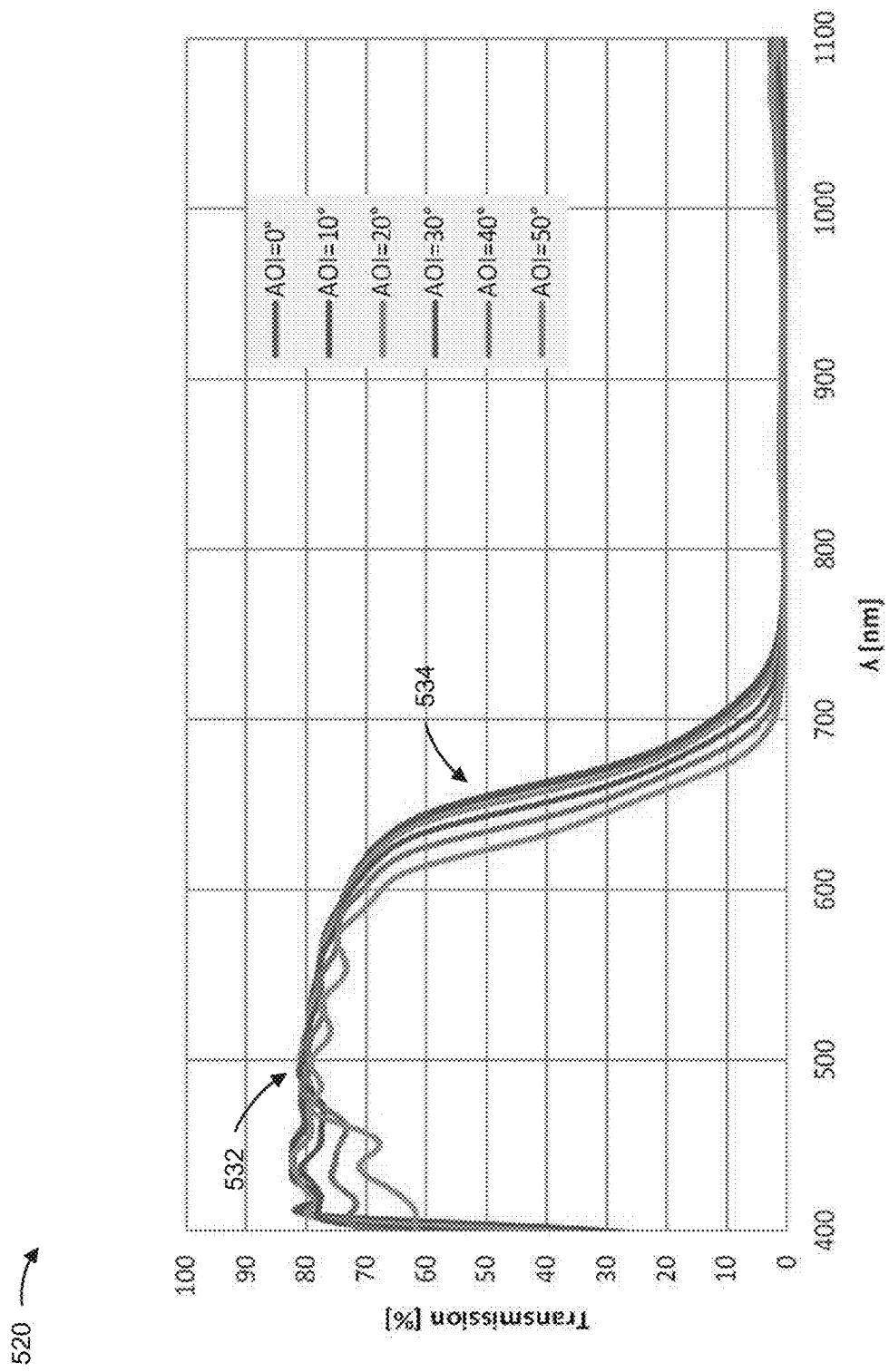
Figure 5C:
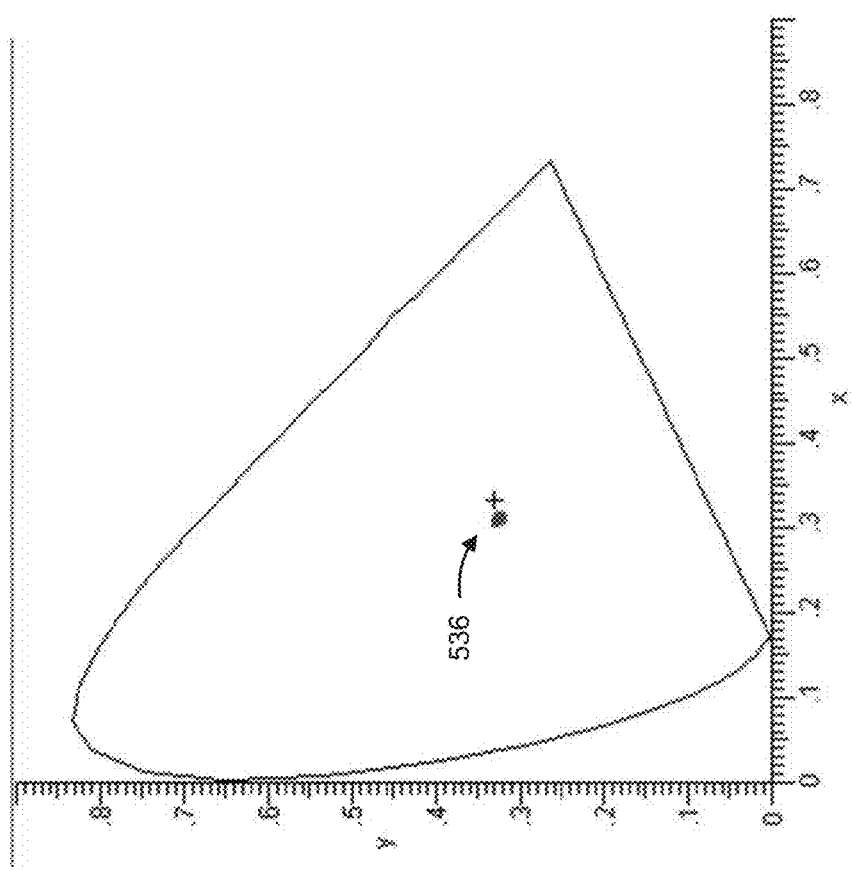

FIGS. 5A-5C are a diagram of characteristics relating to another mixed metal/dielectric optical filter. FIGS. 5A-5C show another example of an induced transmission optical filter with dielectric filter stacks of high-index layers and low-index layers and with metal (e.g., silver) dielectric filter stacks.

As shown in FIG. 5A, and by chart 500, a filter 510 may include a substrate, a set of dielectric layers, and a set of metal layers. As shown by reference number 512, a first portion of filter 510, of layers 1 to 10, includes all-dielectric layers of alternating high-index layers and low-index layers. In this case, the alternating high-index layers and low-index layers are, respectively, niobium titanium oxide layers and silicon dioxide layers. As shown by reference number 514, a second portion of filter 510, of layers 10 to 25, includes metal dielectric layers. In this case, the second portion of filter 510 includes multiple layer groups of one or more niobium titanium oxide layers, one or more zinc oxide layers, and one or more silver layers. As shown by reference number 516, a third portion of filter 510, of layers 25 to 30, includes all-dielectric layers of alternating high-index layers and low-index layers. In this case, the alternating high-index layers and low-index layers are, respectively, niobium titanium oxide layers and silicon dioxide layers. Although filter 510 is described with a particular set of layer thicknesses, other layer thicknesses are possible and may differ from what is shown in FIG. 5A.

As shown in FIG. 5B, and by chart 520; and in FIG. 5C, and by chart 530, filter 510 is associated with a reduced angle shift and color shift relative to filter 210 and an improved transmissivity relative to filter 310. For example, as shown by reference number 532 in FIG. 5B, filter 510 is associated with a transitivity of approximately 80% at approximately 500 nm and at angles of incidence of 0 degrees to 50 degrees, and is associated with a transmissivity greater than approximately 70% for a spectral range of between approximately 460 nm and 590 nm at angles of incidence between 0 degrees and 50 degrees. Similarly, as shown by reference number 534, filter 510 is associated with an angle shift of less than approximately 30 nm for the spectral range of between approximately 400 nm and approximately 1100 nm and angles of incidence between 0 degrees and 50 degrees.

As shown in FIG. 5C, and by chart 530, a CIE 1931 color plot of filter 510 is provided. As shown by reference number 536, filter 510 is associated with a reduced color shift relative to filter 210 for a shift from a 0 degree angle of incidence to a 50 degree angle of incidence. For example, filter 510 is associated with a color shift less than a threshold (e.g., less than 0.2, less than 0.1, less than 0.05, etc.).

As indicated above, FIGS. 5A-5C are provided merely as examples. Other examples are possible and may differ from what was described with regard to FIGS. 5A-5C.

Figure 6A:
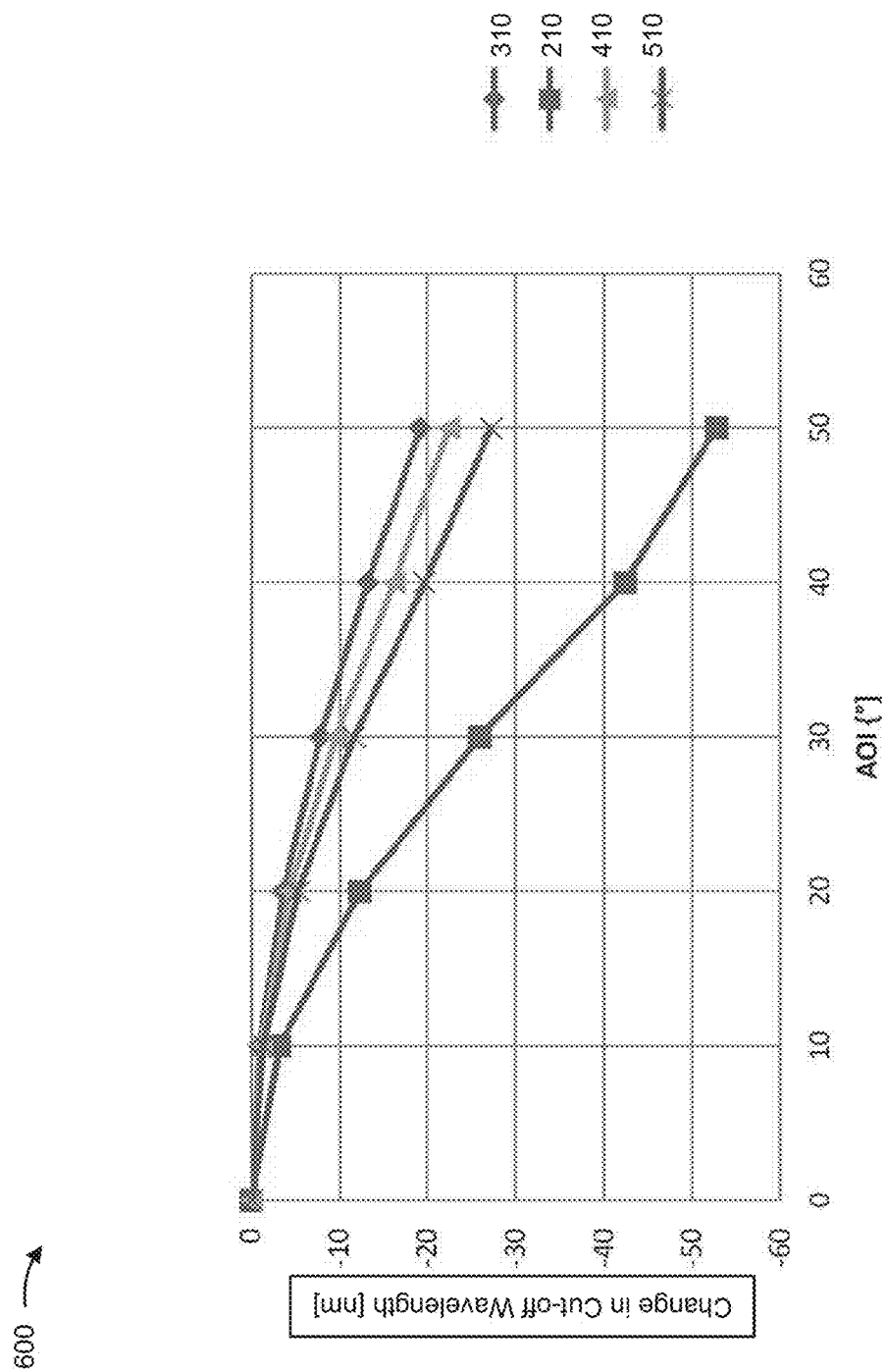
FIGS. 6A and 6B are diagrams of characteristics of a set of optical filters described herein.
Figure 6B:
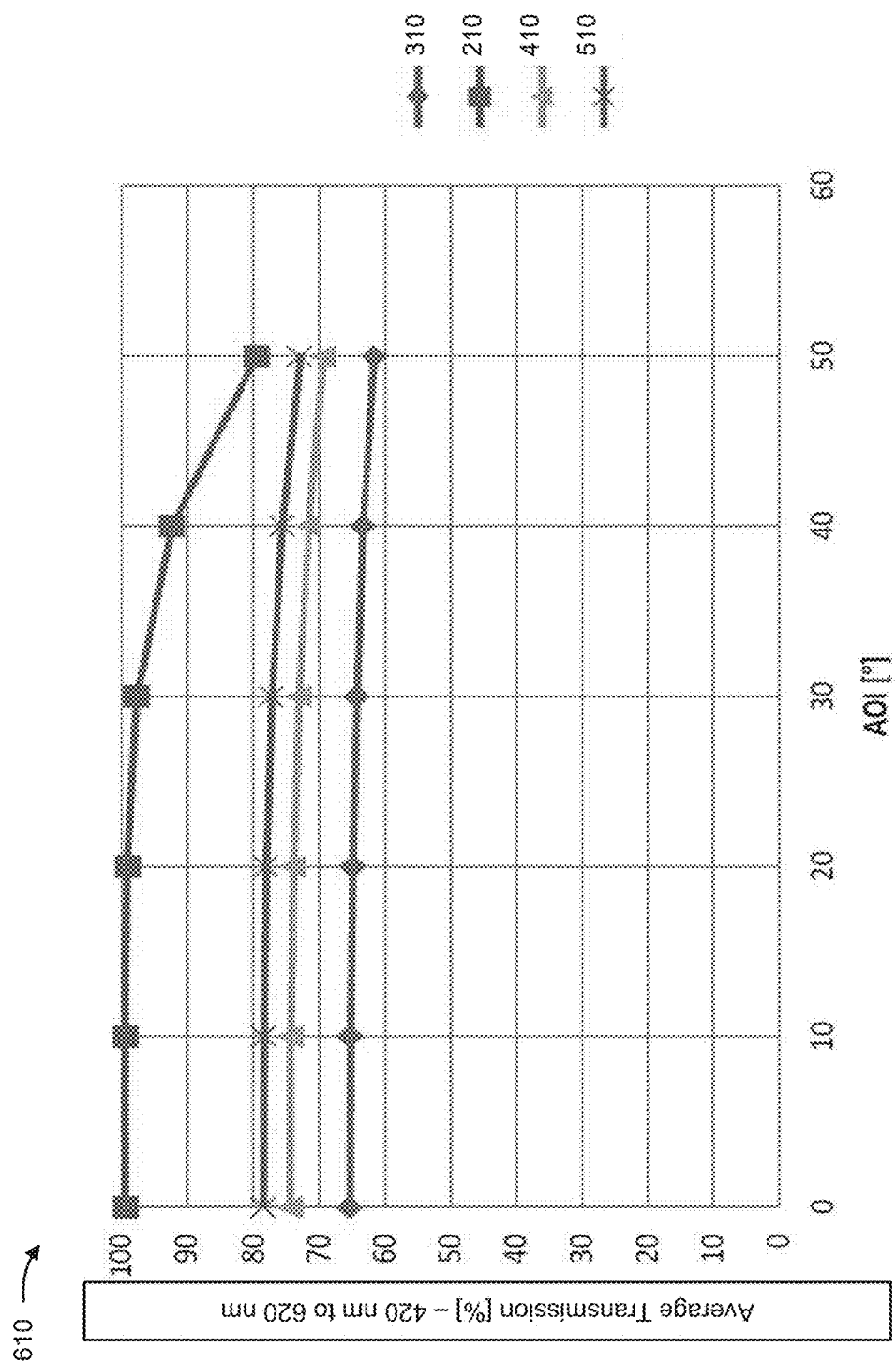

FIGS. 6A and 6B are diagrams of characteristics relating to a set of optical filters. FIGS. 6A and 6B show a comparison of characteristics of filters described herein.

As shown in FIG. 6A, and by chart 600, a comparison of angle shifts of the cut-off wavelength for filter 210, filter 310, filter 410, and filter 510 is provided. In this case, filter 410 and filter 510 are associated with a reduced angle shift of the cut-off wavelength relative to filter 210 at each angle of incidence from 0 degrees to 50 degrees. For example, at an angle of incidence of 40 degrees, filter 410 is associated with an angle shift of a cut-off wavelength of approximately 18 nm. Similarly, at an angle of incidence of 40 degrees, filter 510 is associated with an angle shift of a cut-off wavelength of approximately 20 nm. In contrast, at an angle of incidence of 20 degrees, filter 210 is associated with a change in a cut-off wavelength of approximately 42 nm.

As shown in FIG. 6B, and by chart 610, a comparison of average transmissivity of a passband of a spectral range of approximately 420 nm to approximately 620 nm for filter 210, filter 310, filter 410, and filter 510 is provided. In this case, filter 410 and filter 510 are associated with an improved transmissivity relative to filter 310. At each angle of incidence from 0 degrees to 50 degrees. For example, at an angle of incidence of 40 degrees, filter 410 and filter 510 are associated with an average transmissivity of approximately 72% and approximately 75%, respectively. In contrast, at an angle of incidence of 40 degrees, filter 310 is associated with an average transmissivity of approximately 63%.

As indicated above, FIGS. 6A and 6B are provided merely as examples. Other examples are possible and may differ from what was described with regard to FIGS. 6A and 6B.

FIGS. 7A-7G are diagrams of characteristics relating to a set of optical filters. FIGS. 7A-7G show a comparison of characteristics of green color types of filters described herein.

As shown in FIG. 7A, an example stackup for a filter 702 is provided. Filter 702 may be a green color filter that includes alternating layers of silicon dioxide ($SiO_2$) and niobium titanium oxide ($NbTiO_5$). Filter 702 may be associated with an entrance medium of silicon nitride ($Si_3N_4$) and an exit medium of air. Filter 702 may be an all-dielectric type of filter, and may be similar to filter 210, shown in FIG. 2A.

As shown in FIG. 7B, an example stackup for a filter 704 is provided. Filter 704 may be a green color filter that includes layers of niobium titanium oxide ($NbTiO_5$), zinc oxide (ZnO), and silver (Ag), an entrance medium of silicon nitride ($Si_3N_4$), and an exit medium of air. Filter 704 may be similar to filter 310, shown in FIG. 3A.

As shown in FIG. 7C, an example stackup for a filter 706 is provided. Filter 706 may be a green color filter that includes layers of niobium titanium oxide ($NbTiO_5$), silicon dioxide ($SiO_2$), zinc oxide (ZnO), and silver (Ag), an entrance medium of silicon nitride ($Si_3N_4$), and an exit medium of air. Filter 706 may be similar to filter 410 shown in FIG. 4A. For example, filter 706 may include a first portion, such as layers 1 through 13, that includes alternating dielectric layers; a second portion, such as layers 13 to 25, that includes alternating dielectric layers and metal layers; and a third portion, such as layers 25 to 37, that includes alternating dielectric layers.

Figure 7D:
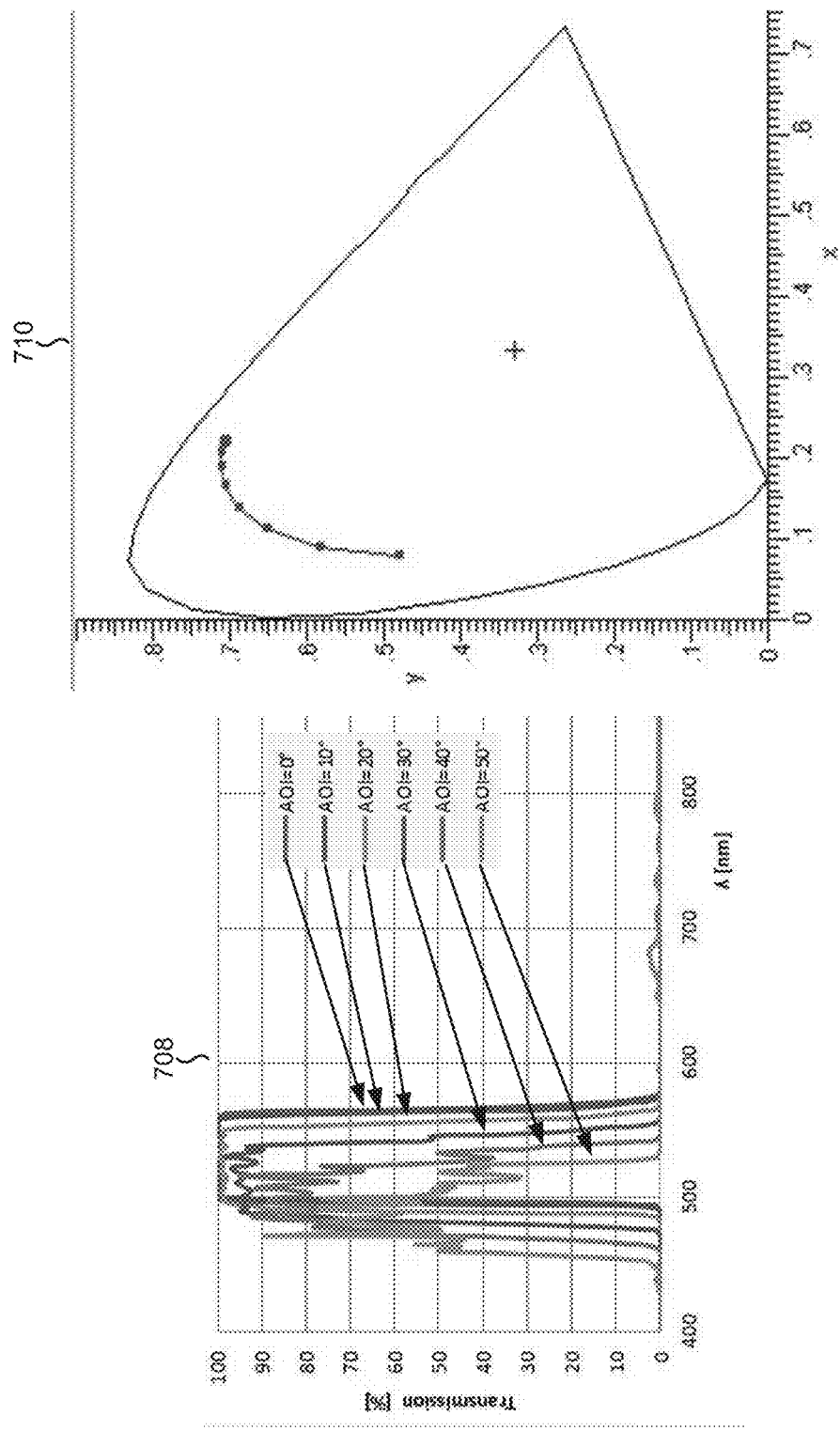

As shown in FIG. 7D, and by charts 708 and 710, a filter response for filter 702 is provided. For example, filter 702 is associated with an angle shift for a change in angle of incidence (AOI) from approximately 0 degrees to approximately 50 degrees of between approximately 50 nm and approximately 80 nm for a spectral range of between approximately 450 nm and approximately 575 nm. Moreover, filter 702 is associated with a drop in peak transmission in a passband from approximately 100% at an angle of incidence of approximately 0 degrees to approximately 90%/o at an angle of incidence of approximately 50 degrees. Furthermore, filter 702 is associated with a color shift in a CIE 1931 color plot from approximately [0.08, 0.47] to approximately [0.25, 0.69].

Figure 7E:
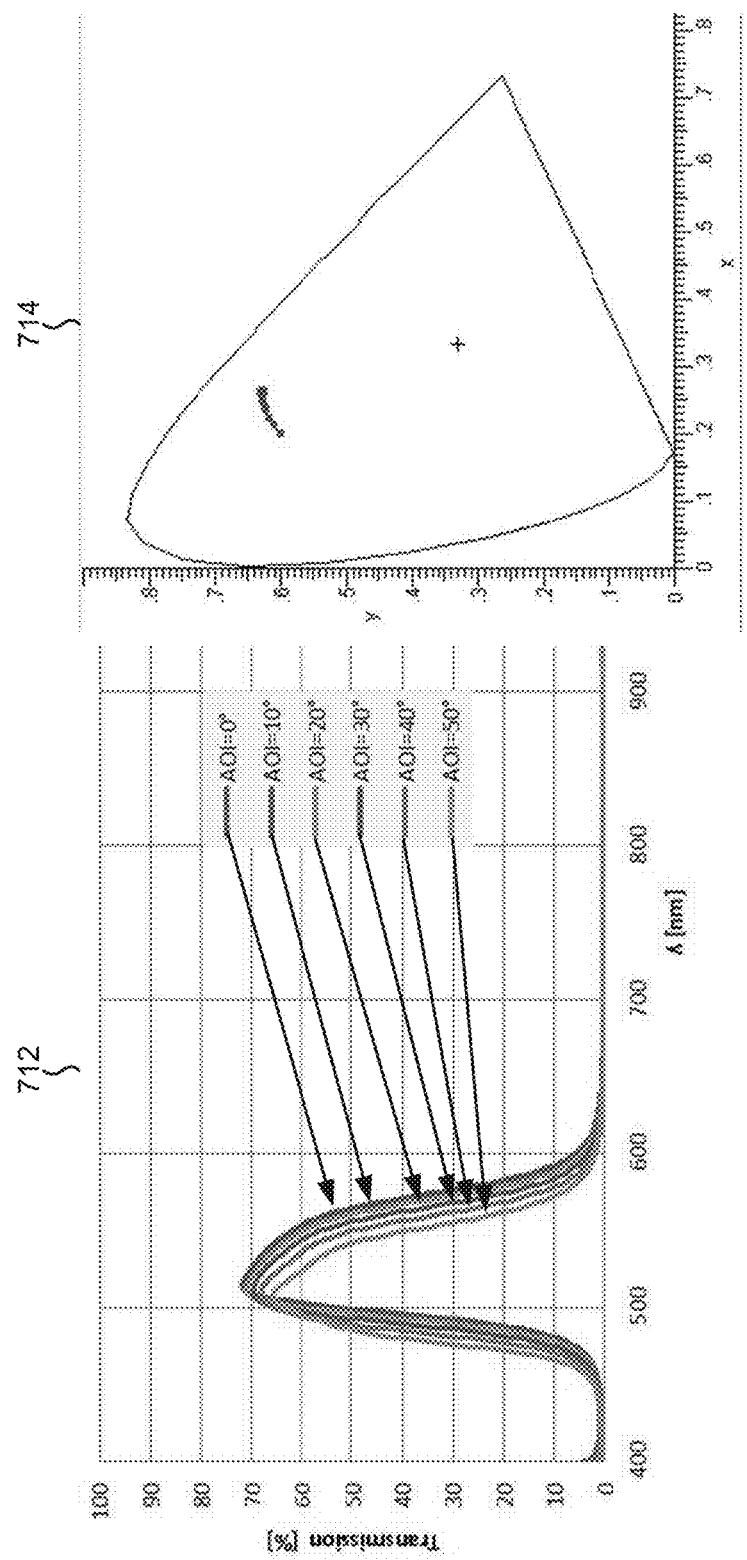

As shown in FIG. 7E, and by charts 712 and 714, a filter response for filter 704 is provided. For example, filter 704 is associated with an angle shift for a change in angle of incidence (AOI) from approximately 0 degrees to approximately 50 degrees of between approximately 25 nm and approximately 40 nm for a spectral range of between approximately 450 nm and approximately 575 nm. Moreover, filter 704 is associated with a drop in peak transmission in a passband from approximately 72% at an angle of incidence of approximately 0 degrees to approximately 66% at an angle of incidence of approximately 50 degrees. Furthermore, filter 704 is associated with a color shift in a CIE 1931 color plot from approximately [0.17, 0.58] to approximately [0.26, 0.63].

Figure 7F:
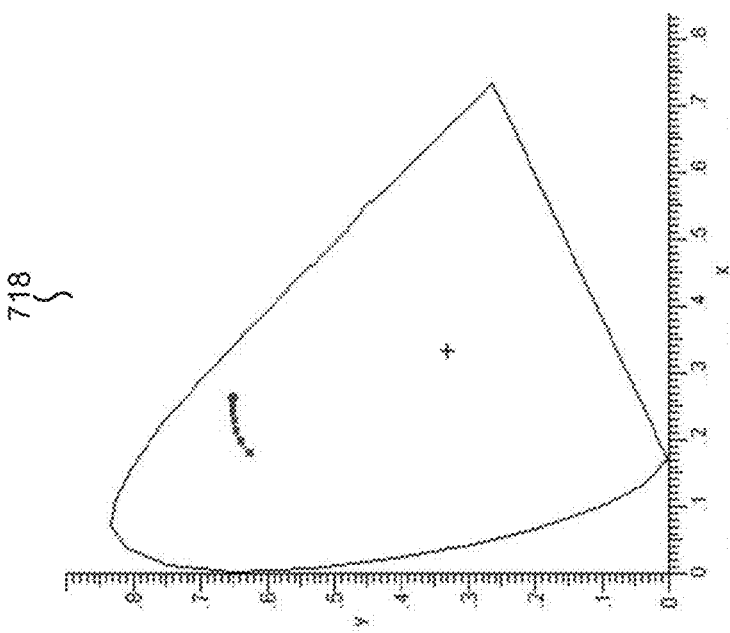
Figure 7F:
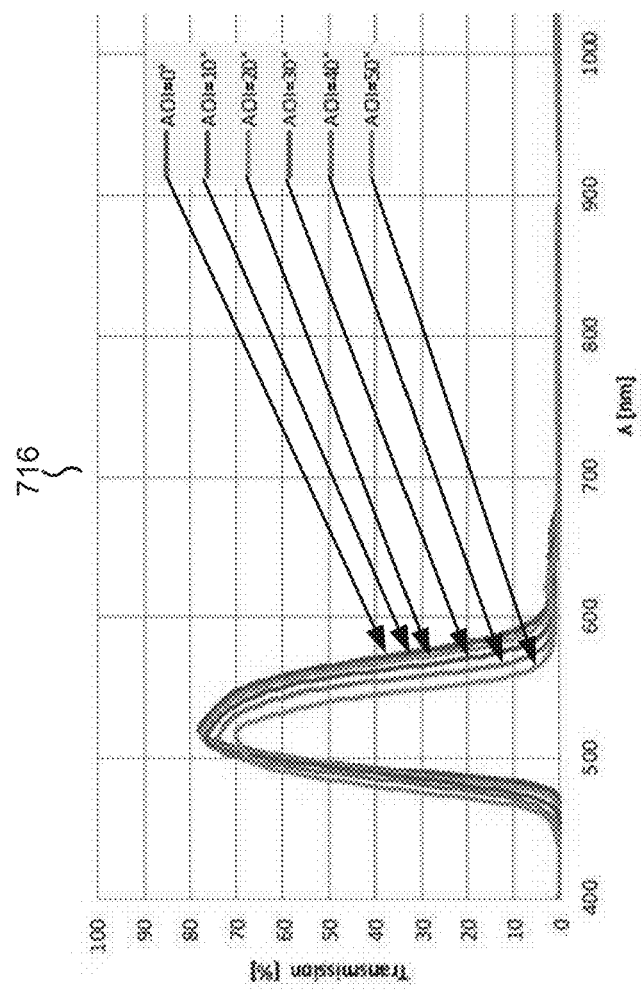

As shown in FIG. 7F, and by charts 716 and 718, a filter response for filter 706 is provided. For example, filter 706 is associated with an angle shift for a change in angle of incidence (AOI) from approximately 0 degrees to approximately 50 degrees of between approximately 25 nm and approximately 40 nm for a spectral range of between approximately 450 nm and approximately 575 nm. Moreover, filter 706 is associated with a drop in peak transmission in a passband from approximately 78% at an angle of incidence of approximately 0 degrees to approximately 70% at an angle of incidence of approximately 50 degrees. Furthermore, filter 706 is associated with a color shift in a CIE 1931 color plot from approximately [0.18, 0.62] to approximately [0.26, 0.65]. In this way, filter 706 is associated with a reduced angle shift and a reduced color shift relative to filter 702 and an improved transmissivity relative to filter 704.

Figure 7G:
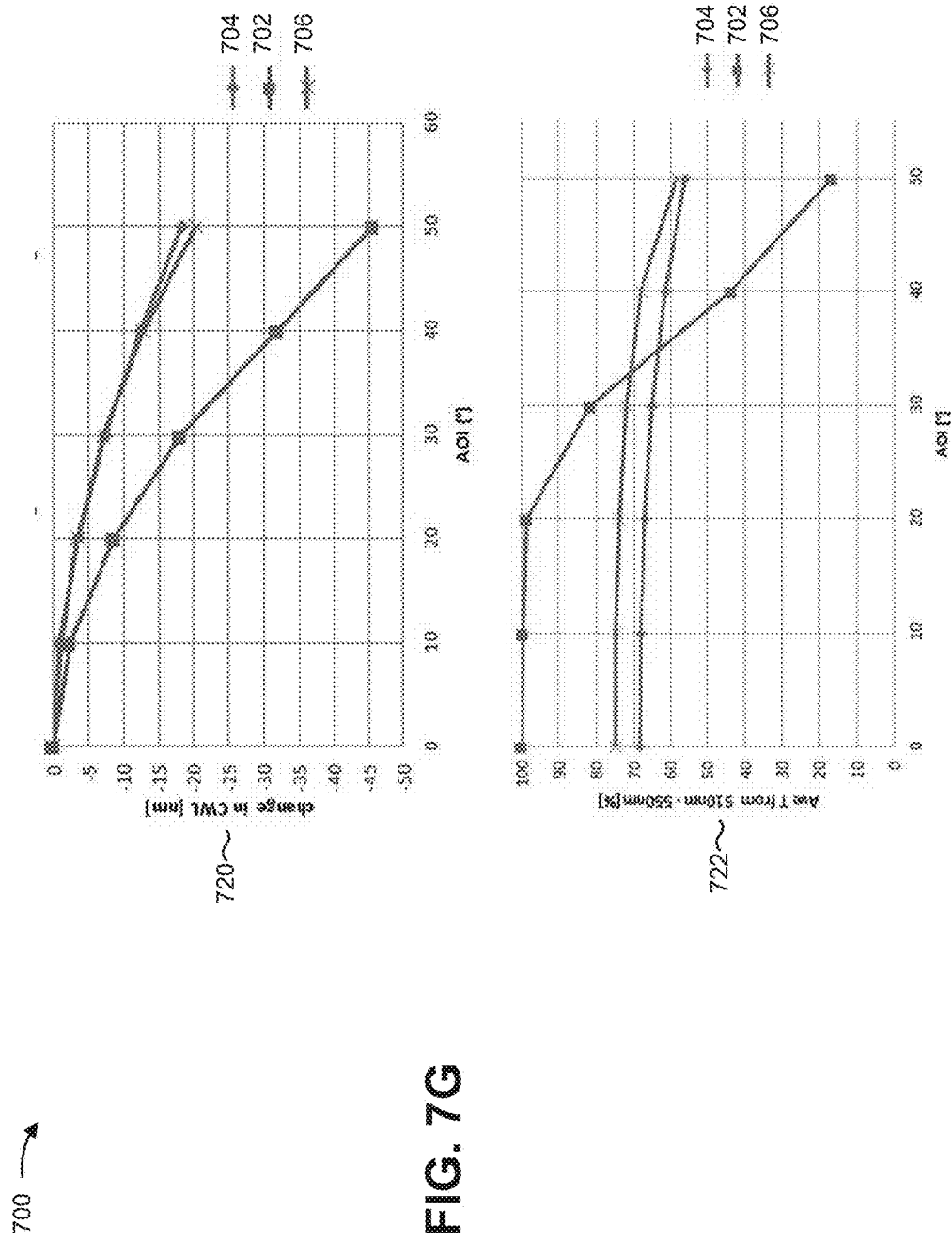

As shown in FIG. 7G, and by charts 720 and 722, a comparison of change in center wavelength and a comparison in average transmission in a passband of approximately 510 nm to approximately 550 is provided, respectively, for filter 702, filter 704, and filter 706. As shown in chart 720, filter 706 is associated with a reduced change in center wavelength relative to filter 702 for angles of incidence of approximately 10 degrees to approximately 50 degrees. As shown in chart 722, filter 706 is associated with an improved average transmission, in the passband, relative to filter 704 for angles of incidence of approximately 0 degrees to approximately 50 degrees, and an improved average transmission relative to filter 706 for angles of incidence, in the passband, from approximately 40 degrees to approximately 50 degrees.

As indicated above, FIGS. 7A-7G are provided merely as examples. Other examples are possible and may differ from what was described with regard to FIGS. 7A-7G.

In this way, utilization of a filter that includes a first portion of dielectric layers, a second portion of mixed dielectric and metal layers, and a third portion of dielectric layers provides filtering with a reduced angle shift and improved transmissivity relative to an all-dielectric filter or LAS ITF filter. Based on reducing an angle shift and improving a transmissivity, an accuracy of data obtained by a sensor element aligned to the filter is improved relative to an accuracy of data obtained by a sensor element aligned to another type of filter.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical filter, comprising:
    a first group of layers,
        the first group of layers including alternating layers of a first dielectric material, of a group of dielectric materials, and a second dielectric material of the group of dielectric materials;
    a second group of layers,
        the second group of layers including alternating layers of a third dielectric material, of the group of dielectric materials, and a fourth dielectric material of the group of dielectric materials; and
    a third group of layers,
        the third group of layers including alternating layers of a fifth dielectric material, of the group of dielectric materials, a sixth dielectric material, of the group of dielectric materials, and a metal material,
        the third group of layers being disposed between the first group of layers and the second group of layers, and
        the optical filter filtering light with less than a threshold angle shift and with greater than a threshold level of transmission.

2. The optical filter of claim 1, where the group of dielectric materials consists of two materials.

3. The optical filter of claim 1, where the group of dielectric materials consists of three materials.

4. The optical filter of claim 1, where the group of dielectric materials includes at least one of:
    niobium titanium oxide ($NbTiO_x$),
    silicon dioxide ($SiO_2$),
    aluminum oxide ($Al_2O_3$),
    titanium dioxide ($TiO_2$),
    niobium pentoxide ($Nb_2O_5$),
    tantalum pentoxide ($Ta_2O_5$),
    zirconium oxide ($ZrO_2$),
    yttrium oxide ($Y_2O_3$),
    hafnium dioxide ($HfO_2$), or
    a combination thereof.

5. The optical filter of claim 1, where the group of dielectric materials includes at least one of:
    a nitride material,
    a fluoride material,
    a sulfide material,
    a selenide material, or
    a combination thereof.

6. The optical filter of claim 1, where the metal material is a silver material.

7. The optical filter of claim 1, further comprising:
    a glass substrate,
        the first group of layers being deposited onto the glass substrate,
        the third group of layers being deposited onto the first group of layers,
        the second group of layers being deposited onto the third group of layers.

8. The optical filter of claim 1, further comprising:
    a detector including a detector substrate,
        the first group of layers being deposited onto the detector substrate, the third group of layers being deposited onto the first group of layers,
the second group of layers being deposited onto the third group of layers.

9. The optical filter of claim 8, where the detector is at least one of:
a complementary metal-oxide-semiconductor (CMOS) detector,
a charge-coupled device detector,
a front illuminated detector, or
a back illuminated detector.

10. The optical filter of claim 1, where the first group of layers and the second group of layers do not include a metal layer.

11. The optical filter of claim 1, where at least one dielectric material, of the group of dielectric materials, is associated with a refractive index greater than approximately 2.0.

12. The optical filter of claim 1, where at least one dielectric material, of the group of dielectric materials, is associated with a refractive index less than approximately 3.0.

13. The optical filter of claim 1, where the threshold angle shift is approximately 30 nm.

14. The optical filter of claim 1, where the threshold level of transmission is approximately 70%.

15. An induced transmission filter, comprising:
a first all-dielectric portion including a first set of dielectric layers;
a second all-dielectric portion including a second set of dielectric layers; and
a metal/dielectric portion including a third set of dielectric layers and one or more metal layers,
the metal/dielectric portion being disposed between the first all-dielectric portion and the second all-dielectric portion, and
the induced transmission filter filtering light with less than a threshold angle shift and with greater than a threshold level of transmission.

16. The induced transmission filter of claim 15, where the first set of dielectric layers and the second set of dielectric layers each includes alternating layers of a first dielectric material with a first refractive index and a second dielectric material with a second refractive index,
the first refractive index being higher than the second refractive index.

17. The induced transmission filter of claim 15, where the first set of dielectric layers, the second set of dielectric layers, and the third set of dielectric layers each includes at least one material in common.

18. The induced transmission filter of claim 15, where the metal/dielectric portion includes a set of layers arranged in a layer group,
the layer group including a plurality of layers in an order of a first layer of a first dielectric material, a second layer of a second dielectric material, a third layer of a metal material, a fourth layer of the second dielectric material, and a fifth layer of the first dielectric material.

19. A mixed metal/dielectric optical filter, comprising:
a substrate;
a first all-dielectric portion including alternating silicon dioxide layers and niobium titanium oxide layers;
a second all-dielectric portion including alternating silicon dioxide layers and niobium titanium oxide layers; and
a metal/dielectric portion including one or more layer groups,
a layer group, of the one or more layer groups, including a silver layer, two zinc oxide layers, and two niobium titanium oxide layers,
the silver layer being disposed between the two zinc oxide layers,
the two zinc oxide layers being disposed between the two niobium titanium oxide layers,
the metal/dielectric portion being disposed between the first all-dielectric portion and the second all-dielectric portion.

20. The mixed metal/dielectric optical filter of claim 19, comprising at least one of:
a color filter,
a bandpass filter,
a near infrared blocker,
long wave pass (LWP) filter,
a short wave pass (SWP) filter,
a photopic filter, or
a tristimulus filter.

* * * * *